(12) United States Patent
Cheon et al.

(10) Patent No.: US 11,115,183 B2
(45) Date of Patent: *Sep. 7, 2021

(54) TERMINAL DEVICE PERFORMING HOMOMORPHIC ENCRYPTION, SERVER DEVICE PROCESSING CIPHERTEXT AND METHODS THEREOF

(71) Applicant: Crypto Lab Inc., Seoul (KR)

(72) Inventors: Jung Hee Cheon, Seoul (KR); Duhyeong Kim, Seoul (KR); Yongsoo Song, San Diego, CA (US); Kyoohyung Han, Goyang-si (KR)

(73) Assignee: Crypto Lab Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,262

(22) Filed: Apr. 22, 2020

(65) Prior Publication Data

US 2020/0252199 A1 Aug. 6, 2020

Related U.S. Application Data

(63) Continuation of application No. 16/478,596, filed as application No. PCT/KR2018/016060 on Dec. 7, 2018, now Pat. No. 10,778,409.

(30) Foreign Application Priority Data

Dec. 15, 2017 (KR) .......................... 10-2017-0173608
Oct. 29, 2018 (KR) .......................... 10-2018-0129749

(51) Int. Cl.
*H04L 9/00* (2006.01)
*H04L 9/30* (2006.01)

(52) U.S. Cl.
CPC .............. *H04L 9/008* (2013.01); *H04L 9/304* (2013.01); *H04L 9/3093* (2013.01)

(58) Field of Classification Search
None
See application file for complete search history.

(56) References Cited

U.S. PATENT DOCUMENTS 8,515,058 B1   8/2013   Gentry
10,116,437 B1  10/2018  Krendelev
(Continued)

FOREIGN PATENT DOCUMENTS

CN   103744976 A  *  4/2014
CN   107294958 A  *  10/2017
(Continued)

OTHER PUBLICATIONS

Chase, Melissa et al., "Security of Homomorphic Encryption", Homomorphic Encryption Standardization Workshop on Jul. 13-14, 2017, pp. 1-27 (28 total pages). (Year: 2017).*
(Continued)

*Primary Examiner* — Michael Pyzocha
(74) *Attorney, Agent, or Firm* — Osha Bergman Watanabe & Burton LLP

(57) ABSTRACT

A decryption method includes: receiving a homomorphic ciphertext; and obtaining a result value added an error value at a message from the received homomorphic ciphertext. The error is disposed on the least significant bit (LSB) side in the homogeneous ciphertext, and the message is disposed at a position adjacent to the error.

11 Claims, 18 Drawing Sheets

(56) References Cited

U.S. PATENT DOCUMENTS

| | | | |
|---|---|---|---|
| 10,211,974 | B2 | 2/2019 | Seo et al. |
| 10,270,588 | B2* | 4/2019 | Youn .................. H04L 9/008 |
| 2006/0140401 | A1 | 6/2006 | Johnson et al. |
| 2011/0194691 | A1* | 8/2011 | Rane .................. H04L 9/008 380/255 |
| 2011/0243320 | A1* | 10/2011 | Halevi ............... H04L 9/0861 380/30 |
| 2012/0039463 | A1 | 2/2012 | Gentry et al. |
| 2013/0170640 | A1* | 7/2013 | Gentry ............... H04L 9/3093 380/30 |
| 2014/0105385 | A1* | 4/2014 | Rane .................. H04L 9/0819 380/30 |
| 2015/0154406 | A1 | 6/2015 | Naehrig et al. |
| 2015/0180659 | A1* | 6/2015 | Youn ..................... H04L 9/14 380/44 |
| 2015/0312028 | A1 | 10/2015 | Cheon et al. |
| 2016/0352710 | A1 | 12/2016 | Hibshoosh et al. |
| 2017/0134157 | A1* | 5/2017 | Laine .................... G09C 1/00 |
| 2017/0134158 | A1 | 5/2017 | Pasol et al. |
| 2017/0149796 | A1 | 5/2017 | Gvili |
| 2017/0201371 | A1 | 7/2017 | Yagisawa |
| 2018/0139054 | A1* | 5/2018 | Chu .................... H04L 9/3247 |
| 2018/0294950 | A1* | 10/2018 | Khedr ................. H04L 9/008 |
| 2020/0242466 | A1* | 7/2020 | Mohassel ........... G06F 21/6254 |

FOREIGN PATENT DOCUMENTS

| | | | | |
|---|---|---|---|---|
| EP | 2317689 | A2 | 5/2011 | |
| KR | 20140095179 | A | 8/2014 | |
| KR | 20150122513 | A | 11/2015 | |
| KR | 20170122458 | A | 11/2017 | |
| WO | WO-2015078533 | A1 * | 6/2015 | ............. H04L 9/008 |

OTHER PUBLICATIONS

Gentry, Craig et al., "Homomorphic Encryption from Learning with Errors: Conceptually-Simpler, Asymptotically-Faster, Attribute-Based", Jun. 8, 2013, pp. 1-25. (Year: 2013).*

Lu, Wen-jie et al., "Using Fully Homomorphic Encryption for Statistical Analysis of Categorical, Ordinal and Numerical Data", Network and Distributed System Security Symposium (NDSS) in Feb. 2017, pp. 1-21. (Year: 2017).*

Lu, Wenjun et al., "Confidentiality-Preserving Image Search: A Comparative Study Between Homomorphic Encryption and Distance-Preserving Randomization", IEEE, 2014, pp. 125-141. (Year: 2014).*

Dowlin, Nathan et al., "Manual for Using Homomorphic Encryption for Bioinformatics", Proceedings of the IEEE | vol. 105, No. 3, Mar. 2017, pp. 552-567. (Year: 2017).*

Coron, Jean-Sebastien et al., "Scale-Invariant Fully Homomorphic Encryption over the Integers", PKC 2014, LNCS 8383, pp. 311-328. (Year: 2014).*

Liu, Jibang et al., "Performance Analysis of Arithmetic Operations in Homomorphic Encryption", ECE Technical Reports. Paper 404, 2010, pp. 1-17 (20 total pages). (Year: 2010).*

European Search Report issued in corresponding European Patent Application No. 18882269.6 dated Apr. 9, 2020 (7 pages).

Examination Report issued in corresponding European Patent Application No. 18882269.6 dated Apr. 29, 2020 (9 pages).

Linzhi Jiang et al., "Secure outsourcing SIFT: Efficient and privacy-Preserving Image Feature Extraction in the Encrypted Domain"; XP011765151; IEEE Transactions of Dependable and Secure Computing, vol. 17, No. 1; pp. 179-193; Jan. 16, 2020 (15 pages).

Duhyeong Kim et al., "Approximate Homomorphic Encryption over the Conjugate-invariant Ring"; XP061026515; The 21st Annual International Conference on Information Security and Cryptology—ICISC 2018; Oct. 6, 2018 (15 pages).

Junfeng Fan et al., "Somewhat Practical Fully Homomorphic Encryption"; IACR Crptology ePrint Archive, Sections 2.1, 3.2-4; <https://eprint.iacr.org/2012/144.pdf>; Jan. 2012 (6 pages).

International Search Report issued in corresponding application No. PCT/KR2018/016060 dated Mar. 26, 2019 (6 pages).

Written Opinion of the International Searching Authority issued in corresponding application No. PCT/KR2018/016060 dated Mar. 26, 2019 (8 pages).

Notice of Preliminary Rejection issued in corresponding Korean application No. KR1020170173608 dated Oct. 2, 2018 (5 pages).

Decision to Grant a Patent issued in corresponding Korean application No. 10-2017-0173608 dated Jan. 3, 2019 (6 pages).

Jung Hee Cheon et al., "Homomorphic Encryption for Arithmetic of Approximate Numbers"; BNSDOCID: XP61023370A; dated Jul. 5, 2017 (24 pages).

Jung Hee Cheon et al., "Floating-Point of Homomorphic Encryption"; BNSDOCID: XP61020092A; Apr. 29, 2016 (18 pages).

Thomas Shortell et al., "Secure Signal Processing Using Fully Homomorphic Encryption"; ACIVS 2015, LNCS 9386; pp. 93-104; Nov. 6, 2015 (12 pages).

Craig Gentry, "A Fully Homomorphic Encryption Scheme"; Sep. 2009 (209 pages).

Xiang Guang-li et al., "A Method of Homomorphic Encryption"; WUJNS Wuhan University Journal of Natural Sciences, vol. 11, No. 1, pp. 181-184; Jan. 2006 (4 pages).

Craig Gentry, "Fully Homomorphic Encryption Using Ideal Lattices"; STOC'09; pp. 169-178; May 31-Jun. 2, 2009 (10 pages).

Supplemental Partial European Search Report issued in corresponding European Application No. 18882269 dated Nov. 15, 2019 (9 pages).

Written Opinion issued by the Intellectual Property Office of Singapore in corresponding Singapore Patent Application No. 11202001984S dated Nov. 19, 2020 (7 pages).

Extended European Search Report issued by the European Patent Office in corresponding European Application No. 20200111.1 dated Feb. 1, 2021 (9 pages).

Office Action issued in corresponding Japanese Patent Application No. 2019-572731 dated Feb. 24, 2021 (12 pages).

* cited by examiner

TERMINAL DEVICE PERFORMING HOMOMORPHIC ENCRYPTION, SERVER DEVICE PROCESSING CIPHERTEXT AND METHODS THEREOF

CROSS-REFERENCE TO RELATED APPLICATIONS

This application is a continuation application of U.S. patent application Ser. No. 16/478,596, filed on Jul. 17, 2019, which is a national stage application of International Application No. PCT/KR2018/016060, filed on Dec. 7, 2018, which claims priority to Korean Application Nos. 10-2018-0129749 and 10-2017-0173608, filed on Oct. 29, 2018 and Dec. 15, 2017, respectively. The disclosures of these priority applications are incorporated herein in their entireties.

TECHNICAL FIELD

The disclosure relates to a terminal device performing homomorphic encryption, a server device processing the ciphertext, methods thereof, and a homomorphic encryption method of adjusting a plaintext space of a ring to a real number space and generating a homomorphic ciphertext with improved computation speed.

BACKGROUND ART

The advancement of electronic and communication technologies has supported a variety of services transceiving data between various devices and utilizing the transceived data. For example, the cloud computing service in which a user stores his or her personal information in a server and utilizes information of the server by using his or her terminal device has been actively used.

In such an environment, it is essential to use security technology to prevent data leakage. Accordingly, the server stores an encrypted data. In this case, it is necessary that encrypted data is decrypted every time the server searches data stored therein or performs a series of operations based on the data, and thus resources and time are wasted.

In addition, when a hacking of a third party is performed while the server performs decryption temporarily for computation, there is a problem that personal information can be easily leaked to the third party.

To resolve this problem, a homomorphic encryption method has been studied. According to a homomorphic encryption, even if a computation is performed in a ciphertext itself without decrypting encrypted information, it is possible to obtain the same result as a value obtained by performing computation of a plaintext and then encrypting the computed plaintext. Accordingly, various computations may be performed in a state that the ciphertext is not decrypted.

However, when an integer computation is performed according to a related-art homomorphic encryption method, there is a problem that the number of bits of the plaintext increases exponentially and the time required for the computation increases significantly. Meanwhile, the related-art homomorphic encryption method has a drawback that an imaginary number part of a plaintext increases in a computation process. For example, since the related-art homomorphic encryption method performs homomorphic encryption of a message in a complex number space, an error is added to the imaginary number part even when a homomorphic encryption of a message of the real number space is performed. If a computation of a homomorphic encryption is repeated, an error of the imaginary number space gradually increases, and when an error of the imaginary number space is significantly increased, a message of a real number part corresponding to an actual message may be damaged in a homomorphic multiplication computation thereafter.

Accordingly, a method capable of improving a computation speed even in the state of a ciphertext and preventing the imaginary number part of the plaintext from being increased in the computation process is demanded.

The above information is presented as background information only to assist with an understanding of the disclosure. No determination has been made, and no assertion is made, as to whether any of the above might be applicable as prior art with regard to the disclosure.

EXPLANATION OF THE INVENTION

Technical Problem

Aspects of the disclosure are to address at least the above-mentioned problems and/or disadvantages and to provide at least the advantages described below. Accordingly, an aspect of the disclosure is to provide a terminal device generating a homomorphic ciphertext by reflecting a scaling factor in a message and then encrypting the message, a server device computing the ciphertext, and methods thereof. In addition, an aspect of the disclosure is to provide a method for performing homomorphic encryption of a real number plaintext by adjusting a plaintext space of a ring to a real number space and generating a homomorphic encryption with improved computation speed.

Technical Solution

In accordance with an aspect of the disclosure, an encryption method of a terminal device is provided. The encryption method includes setting a scaling factor, and reflecting the scaling factor in a message to be encrypted, and performing encryption using a public key to generate a homomorphic ciphertext. The homomorphic encryption is, based on a decryption being performed, in a form that a result value obtained by adding an error value to a value obtained by reflecting the scaling factor in the message is restored.

A modulus of the homomorphic ciphertext may be set as an exponentiation of one scaling factor.

A modulus of the homomorphic ciphertext may be set as a value obtained by multiplying a plurality of different scaling factors by each other. The plurality of different scaling factors may be set as values which are disjoint from each other within a similar range.

The generating the homomorphic ciphertext may include calculating an error from a discrete Gaussian distribution or a distribution that is within a short statistical distance to the discrete Gaussian distribution, and multiplying the message by the scaling factor and adding the error to the multiplied message, and performing encryption using the public key to generate the homomorphic ciphertext.

The encryption method may further include, based on the message being a plurality of message vectors, converting the plurality of message vectors into a polynomial in a form capable of being encrypted in parallel. The generating the homomorphic ciphertext may include multiplying the polynomial by the scaling factor, and performing homomorphic encryption using the public key.

In accordance with another aspect of the disclosure, a ciphertext processing method of a server device is provided.

The ciphertext processing method includes receiving a plurality of homomorphic ciphertext that are individually encrypted, performing a predetermined computation with respect to the plurality of homomorphic ciphertext, and eliminating a noise domain from a result ciphertext calculated by the computation and extracting data of a valid domain. Each of the plurality of homomorphic ciphertext may be a ciphertext generated by multiplying a message by a scaling factor, and performing encryption of the multiplied message. The noise domain may be determined to correspond to a size of the scaling factor.

The ciphertext processing method may further include, based on each of the plurality of homomorphic ciphertext is a ciphertext generated by packing a plurality of message vectors, performing a computation process in parallel of message vectors included in each of the plurality of homomorphic ciphertext.

The ciphertext processing method may further include rotating an order of each of message vectors included in the plurality of homomorphic ciphertext.

The ciphertext processing method may further include, based on the message being a complex number, performing a conjugation computation for the plurality of homomorphic ciphertext.

In accordance with another aspect of the disclosure, a terminal device is provided. The terminal device includes a memory configured to store a scaling factor and a public key, a processor configured to reflect the scaling factor in a message to be encrypted, and then perform encryption using the public key, and generate a homomorphic ciphertext, and a communicator configured to transmit the homomorphic ciphertext to an external device. The homomorphic ciphertext is, based on a decryption being performed, in a form that a result value obtained by adding an error value to a value obtained by reflecting the scaling factor in the message is restored.

The terminal device may further include an input interface configured to receive input of the message and the scaling factor. The processor may be configured to store, in the memory, the message input through the input interface and the scaling factor.

The processor may be configured to set a modulus of the homomorphic ciphertext as an exponentiation of the scaling factor, and store the set modulus of the homomorphic ciphertext in the memory.

The processor may be configured to set a modulus of the homomorphic ciphertext as a value obtained by multiplying a plurality of different scaling factors by each other, and store the set modulus of the homomorphic ciphertext in the memory. The plurality of different scaling factors may be set as values which are disjoint from each other within a similar range.

The processor may be configured to calculate an error from a discrete Gaussian distribution or a distribution that is within a short statistical distance to the discrete Gaussian distribution, and to multiply the message by the scaling factor and adding the error to the multiplied message, and then perform encryption using the public key.

The processor may be configured to, based on the message being a plurality of message vectors, convert the plurality of message vectors into a polynomial in a form capable of being encrypted in parallel, and to multiply the polynomial by the scaling factor, and then perform homomorphic encryption using the public key.

In accordance with another aspect of the disclosure, an encryption method of a terminal device is provided. The encryption method includes setting a ring which is a set including elements between which addition and multiplication are defined, the ring including a plaintext space that is a real number from among sets that are closed to addition and multiplication, calculating a secret key from the ring, calculating a public key corresponding to the calculated secret key, and applying the public key to a message and generating a homomorphic ciphertext.

The ring may satisfy the following equation:

$$a(X)=(X^{-1}) \text{ where } a(X)\in R, X^{-1}:=-X^{n-1}$$

Here, $a(X)$ is a polynomial corresponding to the ring, and the R is a ring including a real space that is a complex number.

The homomorphic ciphertext may have a complexity of $o(n \log n)$ with respect to an addition or multiplication computation.

The encryption method may further include calculating a first random polynomial from the ring, extracting an error, and modulating the error in the first random polynomial and the secret key, and calculating a second random polynomial. The calculating the public key may include calculating the public key using the first and second random polynomials.

The generating the homomorphic ciphertext may include calculating the message as a polynomial corresponding to the ring, and applying the public key to the calculated polynomial and generating a homomorphic ciphertext.

The encryption method may further include performing at least one computation from among addition or multiplication with respect to the generated homomorphic ciphertext and a pre-generated homomorphic ciphertext. The performing the computation may include performing a first function process with respect to each of the generated homomorphic ciphertext and the pre-generated homomorphic ciphertext, performing a computation between the homomorphic ciphertext for which the first function process is performed, and performing a second function process, which is an inverse function of the first function, with respect to a homomorphic ciphertext for which the computation is performed.

The first function may be a Number Theoretic Transform (NTT) function.

The homomorphic ciphertext may be, based on a decryption being performed, in a form that a result value obtained by adding an error value to the message is restored.

In accordance with another aspect of the disclosure, a terminal device is provided. The terminal device includes a memory configured store a message, and a processor configured to set a ring which is a set including elements between which addition and multiplication are defined, the ring including a plaintext space that is a real number from among sets that are closed to addition and multiplication, to calculate a secret key from the ring, to calculate a public key corresponding to the calculated secret key, and to apply the public key to a message and generate a homomorphic ciphertext.

The ring may satisfy the following equation:

$$a(X)=a(X^-) \text{ where } a(X)\in R, X^{-1}:=-X^{n-1}$$

Here, $a(X)$ is a polynomial corresponding to the ring, and the R is a ring including a real space that is a complex number.

The homomorphic ciphertext may have a complexity of $o(n \log n)$ with respect to an addition or multiplication computation.

The processor may be configured to calculate a first random polynomial from the ring, to extract an error, to modulate the error in the first random polynomial and the secret key, and calculate a second random polynomial, and to calculate the public key using the first and second random polynomials.

The processor may be configured to calculate the message as a polynomial corresponding to the ring, and to apply the public key to the calculated polynomial and generate a homomorphic ciphertext.

The processor is configured to perform a first function process with respect to each of the generated homomorphic ciphertext and the pre-generated homomorphic ciphertext, to perform at least one computation from among addition or multiplication between the homomorphic ciphertext for which the first function process is performed, and to perform a second function process, which is an inverse function of the first function, with respect to a homomorphic ciphertext for which the computation is performed.

The first function may be a Number Theoretic Transform (NTT) function.

Advantageous Effects

According to the various embodiments of the disclosure as described above, a homomorphic ciphertext including a valid domain may be generated, and thus it is possible to reduce computation time and burden while minimizing message loss.

In addition, since a homomorphic ciphertext is generated by adjusting a plaintext space of a ring to a real number space, it is possible to initially block the increase of the imaginary number part of the plaintext in the computation process, and to support twice as many as parallel real number computations with the same stability, computation speed, memory (ciphertext and key size) as the previous HEAAN.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The same reference numerals are used to represent the same elements throughout the drawings.

BEST MODE

Hereinafter, embodiments will be described in more detail with reference to the accompanying drawings. The information (data) transmission process performed in this disclosure may include encryption/decryption as needed. In the disclosure and claims, expressions describing the process of transmitting information (data) are to be construed as including encryption/decryption, even if not mentioned separately. Expressions of the form "transmit (transfer) from A to B" or "receive from B by A" in this disclosure include transmission (transfer) or reception of another medium in between, and do not just represent direct transmission (transfer) from A to B or direct reception from B by A.

In the description of the disclosure, the order of each step should be understood to be non-limiting, unless the preceding step must be performed logically and temporally before the following step. In other words, except for the exceptional case above, even if the process described in the following step is performed before the process described in the preceding stage, the nature of the invention is not affected and the scope of the right should be defined regardless of the order of the steps. In addition, "A or B" is defined herein to mean not only selectively pointing to either A or B, but also including both A and B. In addition, it is to be understood that the term "comprise" is intended to encompass further including other elements in addition to the elements listed as being included.

Only essential components necessary for explanation of the present invention are described in this disclosure, and components not related to the essence of the present invention are not mentioned. The disclosure should not be construed in an exclusive sense that includes only the recited elements, but should be interpreted in a non-exclusive sense to include other elements as well.

In this specification, the term "value" is defined as a concept including not only a scalar value but also a vector.

The mathematical operation and computation of each step of the disclosure to be described later can be realized by a computer operation by a coding method well known for carrying out the computation or the calculation and/or coding designed according to the disclosure.

The specific formulas described below are exemplarily described in various possible alternatives, and the scope of the disclosure should not be construed as limited to the formulas mentioned in the disclosure.

For convenience of description, the following notations will be used in the disclosure.

a←D: Select element (a) according to distribution (D)

$s_1, s_2 \in R$: Each of $s_1$ and $s_2$ is an element of a set R.

Mod(q): Perform a modular computation by an element q.

⌊.⌉: Round up an internal value.

Hereinafter, various embodiments of the disclosure will be described in detail with reference to the accompanying drawings.

Figure 1:
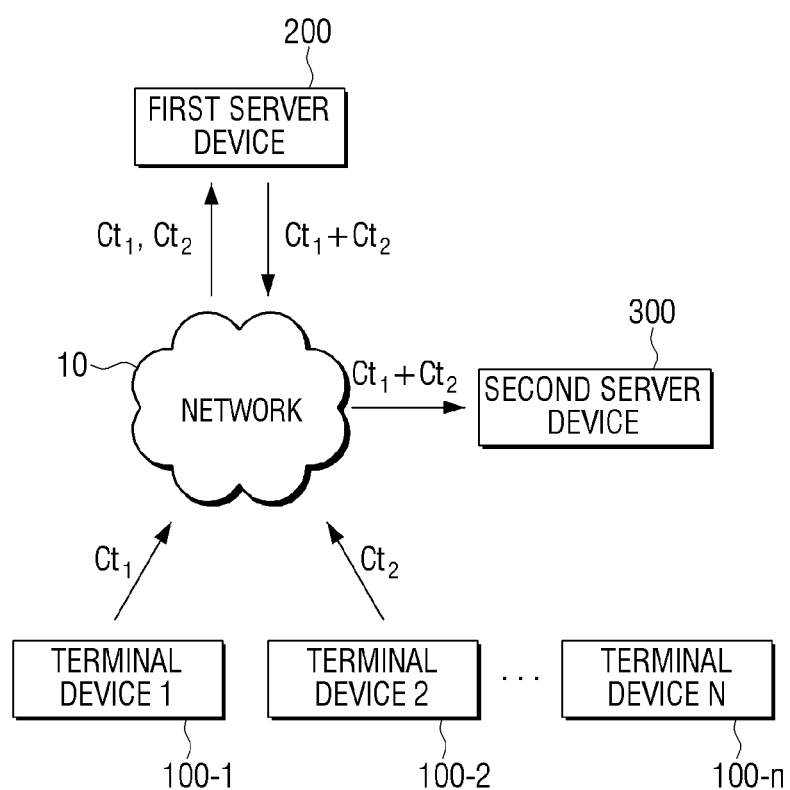
FIG. 1 is a diagram illustrating a structure of a network system, according to an embodiment of the disclosure.

FIG. 1 is a diagram illustrating a configuration of a network system, according to an embodiment of the disclosure. Referring to FIG. 1, a plurality of terminal devices 100-1 to 100-n, a first server device 200 and a second server device 300 may be connected to each other via a network 10. The network 10 may be implemented as a wired/wireless communication network, a broadcast communication network, an optical communication network and a cloud network of various types, and the respective devices may be connected in the same manner as Wi-Fi, Bluetooth, Near Field Communication (NFC), without any additional medium.

In FIG. 1, it is illustrated that a plurality of terminal devices 100-1 to 100-n are present. However, a plurality of terminal devices are necessarily used, but one device may be used. For example, the terminal devices 100-1 to 100-n may be implemented as a device of various forms such as a mobile phone, a tablet personal computer (PC), a game player, a desktop PC, a laptop PC, a home server, and a kiosk, and may be also implemented as a home appliance to which an Internet-of-Things (IoT) technology is applied.

The user may input various information via terminal devices that he or she uses. The input information may be stored in the terminal devices 100-1 to 100-n itself, but may be transmitted to an external device and stored for reasons of storage capacity, security, etc. In FIG. 1, the first server device 200 may play a role of storing this information, and the second server device 300 may play a role of utilizing some or all of the information stored in the first server device 200.

The respective terminal devices 100-1 to 100-n may perform homomorphic encryption of the input information, and transmit the homomorphic ciphertext to the first server device 200. The first server device 200 may store the obtained homomorphic ciphertext without performing decryption.

The second server device 300 may request a result of performing a specific processing of the homomorphic ciphertext to the first server device 200. The first server device 200 may perform a specific computation according to the request, and then transmit the result to the second server device 300. For example, in a case that ciphertext $ct_1$ and $ct_2$ obtained from the two terminal devices 100-1 and 100-2 are stored in the first server device 200, the second server device 300 may request a value obtained by adding information provided from the two terminal devices 100-1 and 100-2 to the first server device 200. The first server device 200 may perform a computation to add the two ciphertext, and then transmit the result value ($ct_1+ct_2$) to the second server device 300.

The respective terminal devices may include an encryption noise calculated in the process of performing homomorphic encryption, that is, an error. For example, a homomorphic ciphertext generated in the respective terminal devices 100-1 to 100-n may be generated in such a manner that a result value including a message and an error value is restored when decryption is performed using a secret key.

For example, a homomorphic ciphertext generated in the terminal devices 100-1 to 100-n may be generated such that the following property is satisfied when decryption is performed using a secret key.

$$Dec(ct, sk) = \langle ct, sk \rangle = \Delta M + e \pmod{q} \qquad \text{[Mathematical formula 1]}$$

Here, the $<$ and $>$ denote a usual inner product, the ct denotes a ciphertext, the sk denotes a secret key, the M denotes a plaintext message, the e denotes an encryption error value, the $\Delta$ denotes a scaling factor, and the q denotes a modulus of a ciphertext. It is necessary that the q is larger than the $\Delta M$ which is a result value obtained by multiplying a message by a scaling factor. If an error value e is sufficiently small as compared to the $\Delta M$, the $\Delta M+e$, which is a decryption value of the ciphertext, may be a value that can replace the original message with the same precision in significant numeric computations. From among the decrypted data, the error may be disposed on a lowest bit (LSB) side, and the $\Delta M$ may be disposed on a second lowest bit side.

If a size of the message is too small or too large, the size may be adjusted using a scaling factor. When a scaling factor is used, a message in a real number form as well as a message in an integer form may be encrypted, and thus usability can be significantly increased. In addition, by adjusting a size of the message using the scaling factor, a size of a domain where messages are present in the ciphertext after the computation is performed, that is, a size of a valid domain, may be adjusted.

In an embodiment, a ciphertext modulus q may be set in various forms and used. For example, a modulus of a ciphertext may be set as $q=\Delta^L$ which is an exponentiation of a scaling factor. If the $\Delta$ is 2, it may be set as a value such as $q=2^{10}$.

As another example, a ciphertext modulus may be set as a value obtained by multiplying a plurality of different scaling factors. The respective factors may be set as values within similar ranges, that is, values of similar sizes. For example, it may be set such that $q=q_1 q_2 q_3, \ldots, q_x$, where each of the $q_1 q_2 q_3, \ldots, q_x$ is of a similar size to the scaling factor $\Delta$, and is set as values that are in a disjoint relationship with each other. When a scaling factor is set in this manner, the entire computation may be divided into a plurality of modulus computations according to a Chinese Remainder Theorem (CRT), and thus computation burden can be reduced. In addition, as factors of similar sizes are used, when a rounding process is performed in the steps which will be described later, almost the same result as the result value in the previous example may be obtained.

As described above, the ciphertext generated in the respective terminal devices 100-1 to 100-n may be processed by the first server device 200, and then transmitted in the form of a ciphertext to the second server device 300. The second server device 300 may decrypt the obtained ciphertext using a secret key. Since a homomorphic encryption processing has been performed, the decrypted data may be a value such as a result obtained from decrypting the message itself and performing a computation processing of the decrypted message. As a result, it is possible to prevent the risk of leakage to third parties in the intermediate process.

In the embodiment of FIG. 1, a public key used to perform encryption may be generated by the respective terminal devices, or may be generated in the second server device 300 performing decryption, and then distributed to the respective terminal devices.

A Ring-LWE method may be used in the key generation process. When it is assumed that the second server device 300 generates the key, the second server device 300 may set various parameters and rings. For example, various parameters such as a length of plaintext message bits, a size of the public key and secret key, etc. may be set.

The ring may be expressed as in the mathematical formula as shown below.

$$R = \mathbb{Z}_q[x]/(f(x)) \quad \text{[Mathematical formula 2]}$$

The ring refers to a set of polynomials with a predetermined coefficient. For example, the ring refers to a set of n-th polynomials with a coefficient $Z_q$. In the mathematical formula 2, f(x) denotes an n-th polynomial. For example, if n is $\Phi(N)$, f(x) denotes an n-th cyclotomic polynomial. (F(x)) denotes an ideal of $Z_q[x]$ generated by f(x). An Euler totient function, $\Phi(N)$, denotes the number of natural numbers that are disjoint from N and less than N. When $\Phi_N(x)$ is defined as an n-th cyclotomic polynomial, a ring may be expressed as in the mathematical formula as shown below.

$$R = \mathbb{Z}_q[x]/(\Phi_N(x)) \quad \text{[Mathematical formula 3]}$$

Then, the second server device 300 may calculate a secret key (sk) from the ring.

$$sk \leftarrow (1, s(x)), s(x) \in R \quad \text{[Mathematical formula 4]}$$

The s(x) denotes a polynomial which is randomly generated with a small coefficient.

The second server device 300 may calculate a first random polynomial (a(x)) from the ring.

The first random polynomial may be expressed as shown below.

$$a(x) \leftarrow R \quad \text{[Mathematical formula 5]}$$

In addition, the second server device 300 may extract an error from a discrete Gaussian distribution or a distribution that is within a short statistical distance thereto. An error may be expressed as in the mathematical formula as shown below.

$$e(x) \leftarrow \mathcal{D}_{\alpha q}^n \quad \text{[Mathematical formula 6]}$$

When an error is calculated, the second server device 300 may modulate the error with the first random polynomial and the secret key, and calculate a second random polynomial. The second random polynomial may be expressed as shown below.

$$b(x) = -a(x)s(x) + e(x) (\bmod q) \quad \text{[Mathematical formula 7]}$$

Finally, the public key (pk) may be set as shown below, so that the first random polynomial and the second random polynomial are included.

$$pk = (b(x), a(x)) \quad \text{[Mathematical formula 8]}$$

The second server device 300 may transmit the generated public key to the respective terminal devices 100-1 to 100-n. The respective terminal devices 100-1 to 100-n may store the obtained public key, and then use the stored public key to perform encryption.

In the example described above, it is described that the second server device 300 generates a public key and a secret key. However, in another example, the respective terminal devices 100-1 to 100-n or another device may generate at least one of a public key or a secret key, and then share it with another device. In addition, the key generation method described above is only an example, and is not limited thereto. A public key and a secret key may be generated in different ways.

Figure 2:
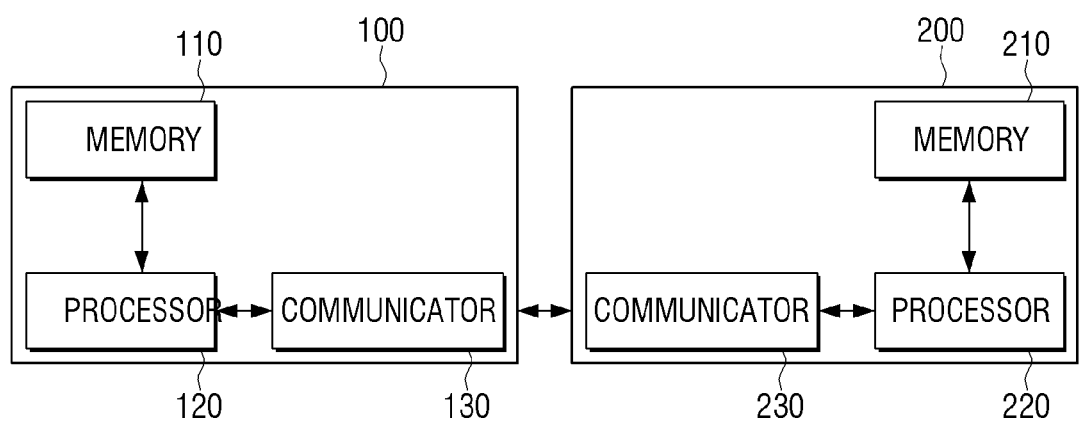
FIG. 2 is a block diagram illustrating a configuration of a terminal device and a server device, according to an embodiment of the disclosure.

FIG. 2 is a block diagram illustrating a configuration of a terminal device 100 and a server device 200, according to an embodiment of the disclosure.

Referring to FIG. 2, the terminal device 100 may include a memory 110, a processor 120, and a communicator 130.

The memory 110 is configured to store an operating system (O/S), various software and data necessary for operating the terminal device 100. The memory 110 may be a variety of forms such as RAM, ROM, flash memory, HDD, external memory, memory card and the like, and is not limited to any one.

The memory 110 may store a public key, a scaling factor, etc.

The processor 120 is an element for executing a program stored in the memory 110 and performing various calculation operations.

The communicator 130 is a configuration for performing communication with external devices. The communicator 130 may be implemented to support not only wireless communication such as Wi-Fi, Zigbee, Bluetooth and NFC, but also wired communication through various wired communication interface.

The processor 120 may reflect a scaling factor in a message to be encrypted, and then encrypt the message using a public key and generate a homomorphic ciphertext. The processor 120 may control the communicator 130 so that the generated homomorphic ciphertext is transmitted to an external device.

The homomorphic ciphertext is generated so that a property as in the mathematical formula 1 as described above is satisfied. For example, the processor 120 may multiply a message to be encrypted, M, by a scaling factor $\Delta$ and calculate a $\Delta M$ which is an integer or a polynomial of an integer coefficient.

Then, a polynomial v may be randomly determined. The processor 120 may calculate the v from a small distribution (for example, a discrete Gaussian distribution or a distribution similar thereto). The processor 120 may obtain an error $e_0$ and $e_1$ from a small error distribution (for example, a discrete Gaussian distribution or a distribution similar thereto). The processor 120 may generate a public key, pk=(b(x), a(x)), and generate a ciphertext using the mathematical formula as shown below.

$$Ctxt = (v \cdot b(x) = \Delta \cdot M + e_0, v \cdot a(x) + e_1) \in R \times R \quad \text{[Mathematical formula 9]}$$

A message to be encrypted may be received from an external source, or may be input from an input device directly provided in the terminal device 100 or from an input device connected to the terminal device 100. In addition, a scaling factor may be directly input by a user, or may be provided through another device. For example, in a case that the terminal device 100 includes a touch screen or a key pad, the processor 120 may store data input by the user through the touch screen or the key pad in the memory 110, and then encrypt the stored data. The generated homomorphic ciphertext may be, when decrypted, restored as a result value of adding an error to a value obtained reflecting a scaling factor in the message. The scaling factor may directly use a value input in advance and set.

The modulus q of the ciphertext mentioned above may be set differently according to embodiments. For example, the processor 120 may set the ciphertext modulus in the form of $q = \Delta^L$ which is an exponentiation of a scaling factor $\Delta$. As another example, the processor 120 may set the ciphertext modulus as a value obtained by multiplying a plurality of different scaling factors. The processor 120 may store the set ciphertext modulus in the memory 110. As described above, the respective factors may be in a disjoint relationship with each other within a similar range.

The processor 120 may use an error for encryption of a public key. An error may be calculated from a discrete Gaussian distribution or a distribution that is within a short statistical distance thereto. For example, an error in a form as in the mathematical formula 6 shown above may be calculated. When a message is input, the processor 120 may add an error to a value obtained by multiplying the message by the scaling factor, and then perform encryption using a public key. In this case, an error value obtained when the ciphertext is decryption may be obtained differently from an initial error added when encryption is performed.

Alternatively, encryption may be performed using the public key immediately in a state that the message is multiplied by the scaling factor. In this case, an error obtained in the encryption process may be added to a result value obtained by multiplying the message by the scaling factor.

The processor 120 may generate a length of ciphertext to correspond to a size of the scaling factor.

Meanwhile, according to an embodiment, packing may be performed. When a packing is used in the homomorphic encryption, it is possible to encrypt multiple messages to a single ciphertext. In this case, when computation between the respective ciphertext is performed in the first server device 200, as a result, computation of the multiple messages may be processed in parallel, and thus computation burden is significantly reduced.

In a case that the message is implemented as a plurality of message vectors, the processor 120 may convert the plurality of message vectors into a polynomial in a form that is capable of being encrypted in parallel, and then multiply a scaling factor by the polynomial and perform homomorphic encryption using the public key. Accordingly, a ciphertext generated by packing the plurality of message vectors may be generated.

For example, the processor 120 may utilize the fact that an n-th cyclotomic polynomial $\Phi_N(x)$ has a different number $n=\phi(N)$ of roots $\zeta_1, \overline{\zeta_1}, \ldots, \zeta_{n/2}, \overline{\zeta_{n/2}}$ (primitive N-th roots of unity) within a complex number $\mathbb{C}$. By employing a concept of complex numbers, it is possible to perform homomorphic encryption of a plurality of messages simultaneously which will be described later.

Then, a canonical embedding function may be modified and a packing function ($\sigma$) may be calculated. The canonical embedding function is a function that corresponds a polynomial $M(x) \in \mathbb{R}[x]/(\Phi_N(x))$ to a pair $(M(\zeta_1), \ldots, M(\zeta_{n/2})) \in \mathbb{C}^{n/2}$—of values of a (n/2) number of roots $\zeta_1, \ldots, \zeta_{n/2}$, rather than a complex conjugate relationship from among the roots $\zeta_1, \overline{\zeta_1}, \ldots, \zeta_{n/2}, \overline{\zeta_{n/2}}$ of $\Phi_N(x)$. The fact that this function is homomorphism can be easily verified by a person skilled in the art.

The canonical embedding function expressed as a matrix (C) is shown below.

$$\begin{pmatrix} 1 & \zeta_1 & \cdots & \zeta_1^{n-1} \\ 1 & \zeta_2 & \cdots & \zeta_2^{n-1} \\ \vdots & \vdots & \ddots & \vdots \\ 1 & \zeta_{n/2} & \cdots & \zeta_{n/2}^{n-1} \end{pmatrix}$$  [Mathematical formula 10]

When a polynomial M(x) is expressed as a column vector of coefficients, $M=(M_0, \ldots, M_{n-1})$, the polynomial M(x) may have a relationship of $C \cdot M = \sigma(M)$ with a packing function of the polynomial $\sigma(M)=(M(\zeta_1), \ldots, M(\zeta_{n/2}))$, that is, a relationship as shown below.

$$\begin{pmatrix} 1 & \zeta_1 & \cdots & \zeta_1^{n-1} \\ 1 & \zeta_2 & \cdots & \zeta_2^{n-1} \\ \vdots & \vdots & \ddots & \vdots \\ 1 & \zeta_{n/2} & \cdots & \zeta_{n/2}^{n-1} \end{pmatrix} \begin{pmatrix} M_0 \\ M_1 \\ \vdots \\ M_{n-1} \end{pmatrix} = \begin{pmatrix} M(\zeta_1) \\ M(\zeta_2) \\ \vdots \\ M(\zeta_{n/2}) \end{pmatrix}$$  [Mathematical formula 11]

As described above, in a state that a canonical embedding function is calculated, when a plurality (for example, n/2) of message vectors $$m=(m_1, \ldots, m_{n/2}) \in \mathbb{C}^{n/2}$$

are input, the processor 120 may convert the message vectors to a polynomial using the canonical embedding function described above.

$$M(x)=\sigma^{-1}(m)$$  [Mathematical formula 12]

A polynomial M(x) converted in the manner as in the mathematical formula 12 satisfies a relationship as in $M(\zeta_i)=m_i$.

The processor 120 may add a scaling factor to the polynomial converted in the manner described above, and then perform homomorphic encryption using a public key. For example, homomorphic encryption may be performed using a Ring Learning with Errors (LWE) which is one of homomorphic encryption methods.

A specific ciphertext may be expressed in a form as shown below.

$$Ctxt=(v \cdot b(x)+\Delta \cdot M+e_0, v \cdot a(x)+e_1) \in R \times R$$  [Mathematical formula 13]

As described above, a homomorphic ciphertext generated by the terminal device 100 may be provided to the first server device 200. The first server device 200 may store a homomorphic ciphertext received from the terminal device 100, and use the stored homomorphic ciphertext in a computation process thereafter. The first server device 200 may perform a computation process with respect to not only multiple homomorphic ciphertext received from a plurality of different terminal devices, but also multiple homomorphic ciphertext received from one terminal device 100.

The first server device 200 may be implemented to include a memory 210, a processor 220 and a communicator 230.

The communicator 230 may receive various homomorphic ciphertext from the terminal device 100. The respective homomorphic ciphertext means data which is individually encrypted in different terminal devices or one terminal device.

The processor 220 may store the received homomorphic ciphertext in the memory 210. FIG. 2 illustrates the memory 210. However, the first server device 200 may further include an additional storage for storing data of large capacity, and may be separately connected to an external storage device and store the respective homomorphic ciphertext in the external storage device.

The processor 220 may perform a preset computation with respect to a plurality of homomorphic ciphertext. A type of computation to be performed may be directly performed by a manger of the first server device 200, and may be requested from the second server device 300.

For example, computation may be set as a canonical computation such as multiplication, division, addition and subtraction, but is not limited thereto. For example, in a case that an encrypted message is a complex number, a conjugate computation may be performed, or a computation such as statistics and sorting may be performed.

In a case that each of the plurality of homomorphic ciphertext is a ciphertext generated by packing a plurality of message vectors, the processor 220 may perform a computation process with respect to a ciphertext of polynomials included in each of the plurality of ciphertext in parallel. In this case, a computation order of the plurality of ciphertext may be rotated, or may be randomly mixed and perform a computation. Specific computation operations of the second server device 200 will be described in detail again below.

In FIG. 2, it is illustrated that each of the terminal device 100 and the first server device 200 includes a communicator, a memory and a processor. However, the example is not limited thereto. That is, depending on the type and use environment of each device, various elements such as an input means, a display and a bus may be further included. For example, the terminal device 100 may further include an input interface (not illustrated) for receiving input of a message to be transmitted or a scaling factor. The processor 120 may store a message input via the input interface or a scaling factor in the memory 110. In addition, the processor 120 may set a modulus of ciphertext in various manners described above, using the input scaling factor, and then store the set modulus in the memory 110.

Figure 3:
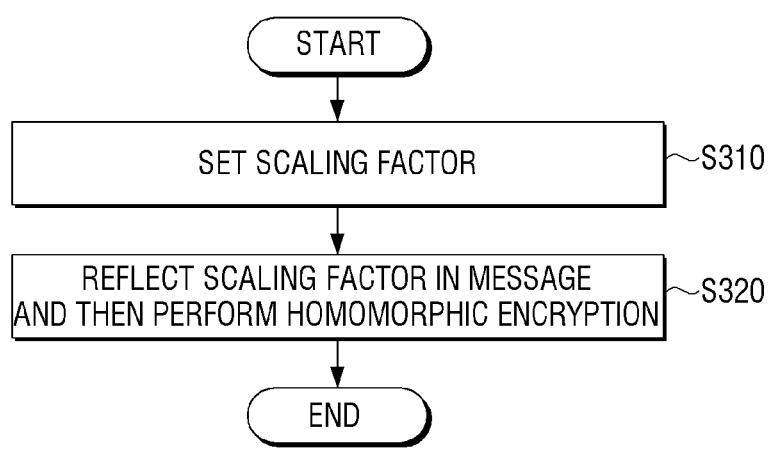
FIG. 3 is a flowchart of an encryption method of a terminal device, according to an embodiment of the disclosure.

FIG. 3 is a flowchart of an encryption method of a terminal device, according to an embodiment of the disclosure.

Referring to FIG. 3, the terminal device 100 may set a scaling factor, at operation S310. A method for setting the scaling factor may be variously implemented as described above.

The terminal device 100 may store the set scaling factor. When a message to be encrypted is generated, the terminal device 100 may reflect the scaling factor in the message, and then perform homomorphic encryption using a public key, at operation S320. The public key may be directly generated by the terminal device 100, or may be provided from an external device.

Figure 4:
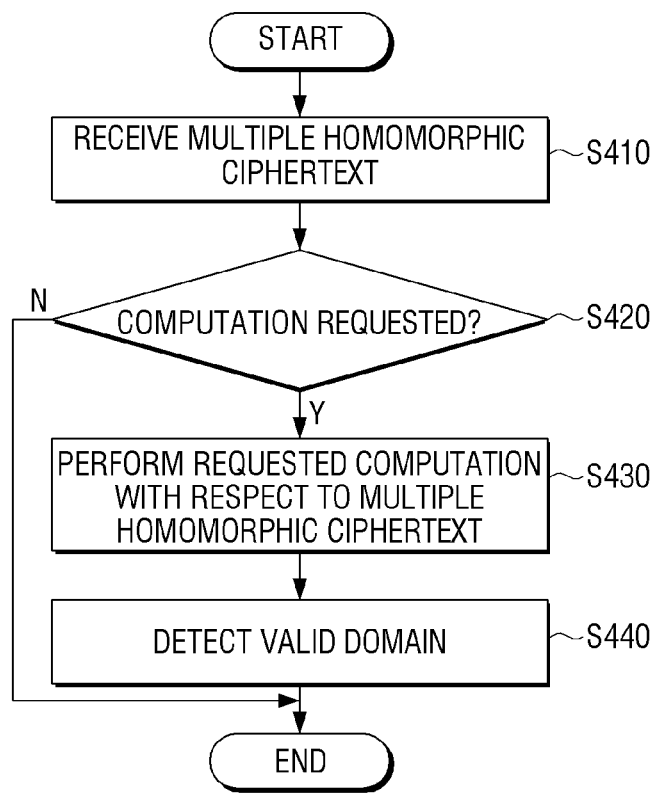
FIG. 4 is a flowchart of a ciphertext processing method of a server device, according to an embodiment of the disclosure.

FIG. 4 is a flowchart of a ciphertext processing method of a server device, according to an embodiment of the disclosure. As illustrated in FIG. 1, a ciphertext process is performed in the first server device, and thus a method performed by the first server device will be described.

Referring to FIG. 4, the first server device 200 may receive a plurality of homomorphic ciphertext, at operation S410. The respective homomorphic ciphertext means data generated by performing homomorphic encryption using a public key in a state that a scaling factor is applied.

When a computation request is input from an external device or a manager, at operation S420, the first server device 200 may perform the requested computation with respect to the plurality of homomorphic ciphertext, at operation S430. When the computation is complete, the first server device 200 may detect data of a valid domain from computation result data. The first server device 200 may perform a rounding process of the computation result data, and detect data of a valid domain. The rounding process means rounding-off a message in an encrypted state, and may be differently referred to as rescaling. For example, the first server device 300 may multiply each component of the ciphertext by $\Delta^{-1}$, which is a reciprocal of a scaling factor, and round off the result, and eliminate a noise domain. The noise domain may be determined to correspond to a size of the scaling factor. As a result, a message of a valid domain from the noise domain is excluded may be detected. Since the rounding process is performed in an encrypted state, a further error occurs. However, the error is small enough to be ignored.

Figure 5:
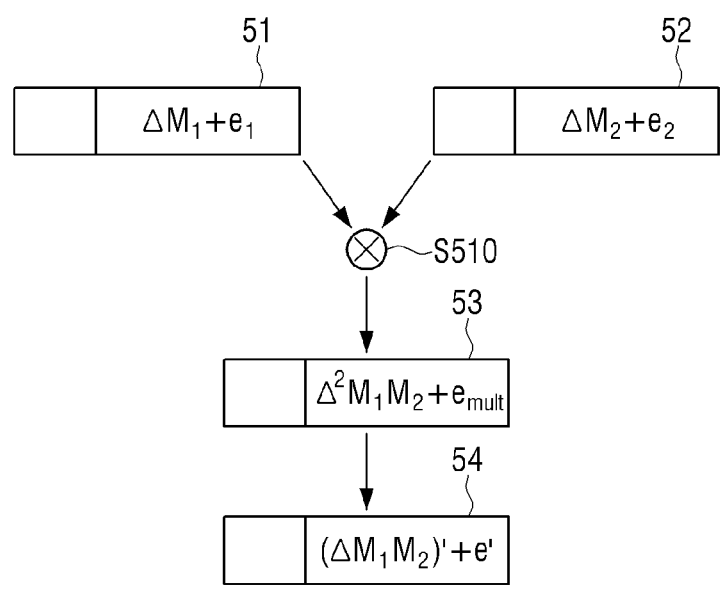
FIG. 5 is a diagram illustrating various examples of a ciphertext processing method of a server device.

FIG. 5 is a mimetic diagram provided to specifically explain a ciphertext processing method of FIG. 4.

For example, when a multiplication computation with respect to a first homomorphic ciphertext 51 and a second homomorphic ciphertext 52 is requested, the first server device 200 may perform multiplication, at operation S510, in an encrypted state and generate a computation ciphertext 53. The obtained computation ciphertext 53 may include a message part ($\Delta^2 M_1 M_2$) in which a scaling factor is reflected and an error data ($e_{mult}$). A size of the error data increases in the multiplication process, but as will be described later, a size of the message part is reduced and thus, no problem occurs. The same applies to addition.

Then, a size of the message part ($\Delta^2 M_1 M_2$) may be reduced to a part corresponding to a valid number, that is, a valid domain, and a final computation ciphertext 54 may be generated. As described above, the second server device 200 may eliminate the noise domain by multiplying the computation ciphertext 53 by a reciprocal number of the scaling factor, and then rounding off the result. As a result, a final computation ciphertext 54 including a data ($\Delta M_1 M_2$)'+e') corresponding to the valid domain may be generated. By this process, a further error is generated and the error data ($e_{mult}$) is changed to e', but a size of the error is small enough to be ignored.

Figure 6:
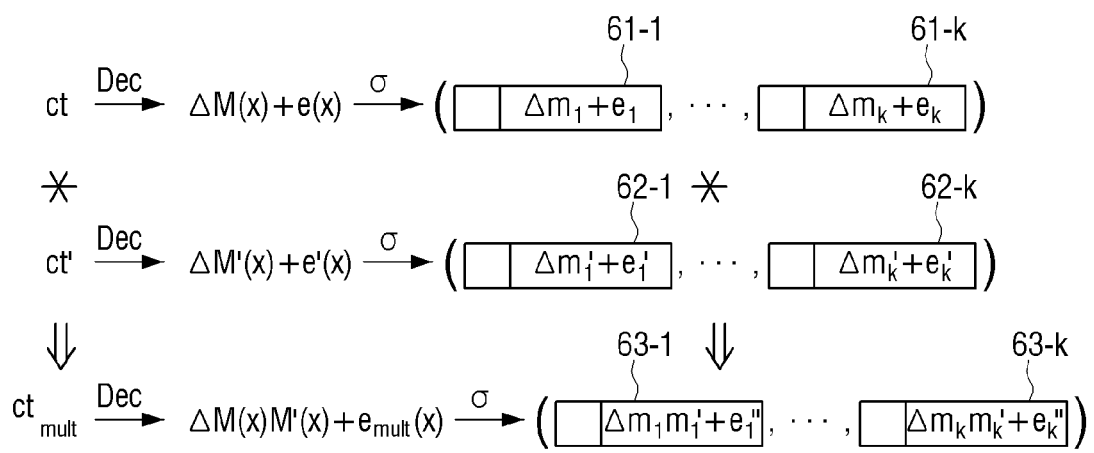
FIG. 6 is a diagram illustrating various examples of a ciphertext processing method of a server device

FIG. 6 illustrates a method for performing a computation in a case where a plurality of messages are encrypted to one ciphertext through the packing method described above. For convenience of explanation, a ciphertext generated by encrypting a plurality of message vectors will be referred to as a packing ciphertext. Referring to FIG. 6, a first packing ciphertext (ct) is a ciphertext generated by encrypting a vector including a plurality of messages 61-1 to 61-k, and a second packing ciphertext (ct') is a ciphertext generated by encrypting a vector including a plurality of messages 62-1 to 62-k.

The first server device 200 may, when a computation with respect to the first packing ciphertext (ct) and the second packing ciphertext (ct') is requested, perform a computation with respect to the two ciphertext by using the methods of the embodiment described above. Consequently, a single instruction multiple data (SIMD) computation in which an in-parallel process of multiple data is possible by a single ciphertext computation may be performed.

Referring to FIG. 6, a first message component 61-1 of the first packing ciphertext (ct) may be multiplied by a first message component 62-1 of the second packing ciphertext (ct'). Simultaneously, multiplication of second message components 61-2 and 62-2 may be performed. As a result, a final packing ciphertext ($ct_{mult}$) may be understood as a ciphertext generated by encrypting vectors 63-1 to 63-k including values obtained by multiplying message components located at the same position.

Figure 7:
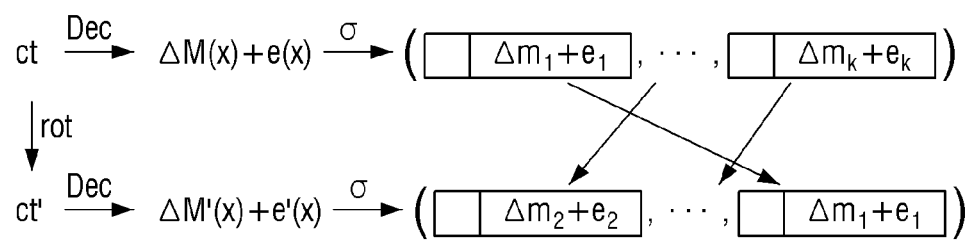
FIG. 7 is a diagram illustrating various examples of a ciphertext processing method of a server device.

FIG. 7 is a diagram provided to explain a method for changing positions of some homomorphic ciphertext and processing them, when an SIMD computation is performed. Referring to FIG. 7, a new second packing ciphertext (ct') may be generated using the first packing ciphertext (ct). The first packing ciphertext (ct) may be shifted so that a first component of the second packing ciphertext matches with a second message component of the first packing ciphertext. Simultaneously, a second component of the second packing ciphertext may be equal to a third message component of the first packing ciphertext. As a result, the second packing ciphertext is a packing ciphertext for which a new message vector generated by moving positions of all messages of the first packing ciphertext is encrypted. In the specification, an operation of moving a position of ciphertext as described above will be referred to a rotation process.

Figure 8:
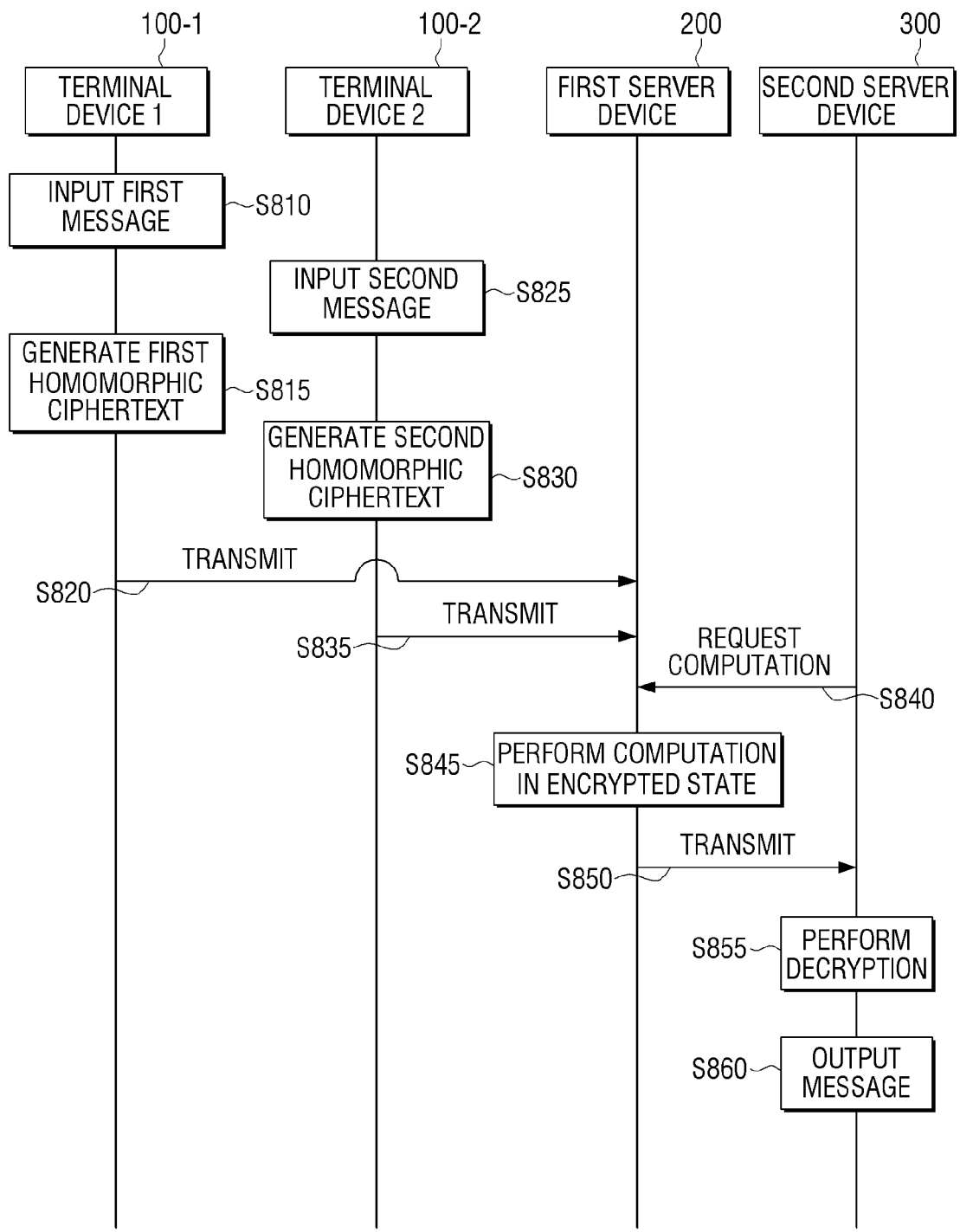
FIG. 8 is a diagram illustrating a ciphertext processing method of a network system, according to an embodiment of the disclosure.

FIG. 8 is a timing diagram provided to comprehensively explain an operation of a network system of FIG. 1. In FIG. 8, a case where a ciphertext is transmitted from two terminal devices 100-1 and 100-2 is described.

First, when a first message is received from a terminal device 1 100-1, at operation S810, the terminal device 1 100-1 may generate a first homomorphic ciphertext as described above, at operation S8150, and transmit the generated first homomorphic ciphertext to the first server device, at operation S820. For example, in a case that a user of the terminal device 1 100-1 captures an image, the image and a capturing location may be encrypted, and in a case that the user reproduces a music content or accesses a specific URL, the reproduction history and the URL access history may be encrypted.

A terminal device 2 100-2 may generate a ciphertext in a similar manner and transmit the generated ciphertext to the first server device 200, at operations S825, S830 and S835. The first server device 200 may store the received ciphertext as it is encrypted. In this state, when the second server device 300 requests a specific computation, at operation S840, the first server device 200 may perform a computation in the encrypted state, at operation S845, and transmit the ciphertext for which the computation has been performed to the second server device, at operation S850. The second server device 300 may decrypt the received ciphertext, and detect the message.

For example, when a ciphertext generated by performing encryption as in the mathematical formula 9 is decrypted the second server device 300 using a secret key, sk=(1, s), the result may be expressed as in the mathematical formula as shown below.

$$\begin{aligned}\langle C_{txt}, sk\rangle &= (v \cdot b(x) + \Delta \cdot M + e_0) + \\ &\quad s(x)(v \cdot a(x) + e_1) \\ &= v(b(x) + a(x)s(x)) + \Delta \cdot \Delta + \\ &\quad e_0 + s(x) \cdot e_1 \\ &= \Delta \cdot M + (v \cdot e + e_0 + s(x) \cdot e_1) \\ &= \Delta \cdot M + e_{small}\end{aligned}$$ [Mathematical formula 14]

As a result, the decrypted data includes a value obtained by adding an error of a small size, $e_{small}$, to a value obtained by multiplying the scaling factor by the message, and the error may be disposed on the LSB side and the $\Delta M$ may be disposed at a position adjacent to the error.

For example, when it is assumed that a first message is 1.23, a second message is 3.45 and a scaling factor is $\Delta=103$, $\Delta M_1+e_1 \approx 1230$ and $\Delta M_2+e_2 \approx 3450$. When a multiplication computation is performed in the first server device 200, the data may be $\Delta^2 M_1 M_2 + e_{total} \approx 4243500$. When the result value is multiplied by $\Delta^{-1}$ and then a rounding process is performed thereto, 4243 is obtained. The second server device 200 may obtain this result value by decryption.

The second server device 300 may output a decrypted message, at operation S860. For example, in a state that the terminal devices 1 and 2 100-1 and 100-2 have respectively transmitted an image to the first server device 200, the second server device 300 may output a photo captured by the respective devices 100-1 and 100-2 at one time.

In the embodiment described above, it is illustrated and described that a computation between ciphertext is performed in the first server device 200, and that a noise domain is eliminated from the ciphertext and then, the ciphertext transmitted to the second server device 300. However, the example is not limited thereto. For example, if the second server device 300 is aware of information about the scaling factor, the second server device 300 may directly eliminate the noise domain and detect a valid domain, and then proceed with the decryption.

Meanwhile, the encryption method and ciphertext processing method as described above may be applicable to a real number plaintext.

Figure 9:
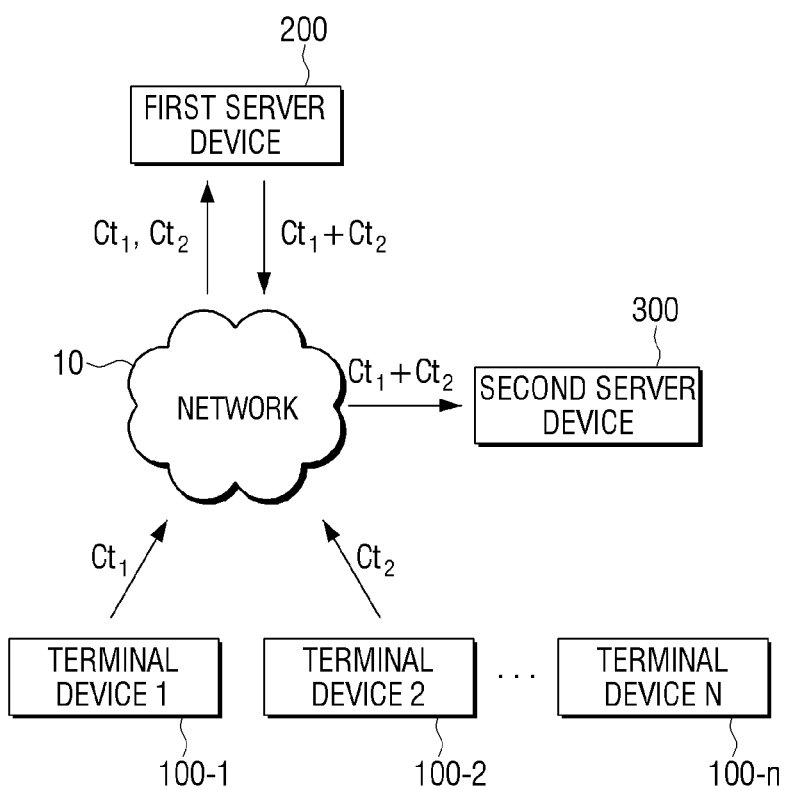
FIG. 9 is a diagram illustrating a structure of a network system, according to an embodiment of the disclosure.

FIG. 9 is a diagram illustrating a configuration of a network system, according to an embodiment of the disclosure.

Referring to FIG. 9, the network system may include a plurality of terminal devices 100-1 to 100-$n$, a first server device 200 and a second server device 300, and the respective elements may be connected to each other via a network 10.

The network 10 may be implemented as a wired/wireless communication network, a broadcast communication network, an optical communication network and a cloud network of various types, and the respective devices may be connected in the same manner as Wi-Fi, Bluetooth, Near Field Communication (NFC), without any additional medium.

In FIG. 9, it is illustrated that a plurality of terminal devices 100-1 to 100-$n$ are present. However, a plurality of terminal devices are necessarily used, but one device may be used. For example, the terminal devices 100-1 to 100-$n$ may be implemented as a device of various forms such as a smartphone, a tablet personal computer (PC), a game player, a desktop PC, a laptop PC, a home server, and a kiosk, and may be also implemented as a home appliance to which an Internet-of-Things (IoT) technology is applied.

The user may input various information via terminal devices that he or she uses. The input information may be stored in the terminal devices 100-1 to 100-$n$ itself, but may be transmitted to an external device and stored for reasons of storage capacity, security, etc. In FIG. 1, the first server device 200 may play a role of storing this information, and the second server device 300 may play a role of utilizing some or all of the information stored in the first server device 200.

The respective terminal devices 100-1 to 100-$n$ may perform homomorphic encryption of the input information, and transmit the homomorphic ciphertext to the first server device 200. The first server device 200 may store the obtained homomorphic ciphertext without performing decryption.

The second server device 300 may request a result of performing a specific processing of the homomorphic ciphertext to the first server device 200. The first server device 200 may perform a specific computation according to the request, and then transmit the result to the second server device 300. For example, in a case that ciphertext $ct_1$ and $ct_2$ obtained from the two terminal devices 100-1 and 100-2 are stored in the first server device 200, the second server device 300 may request a value obtained by adding information provided from the two terminal devices 100-1 and 100-2 to the first server device 200. The first server device 200 may perform a computation to add the two ciphertext, and then transmit the result value ($ct_1+ct_2$) to the second server device 300.

The respective terminal devices 100-1 to 100-$n$ may include an encryption noise calculated in the process of performing homomorphic encryption, that is, an error. For example, a homomorphic ciphertext generated in the respective terminal devices 100-1 to 100-$n$ may be generated in such a manner that a result value including a message and an error value is restored when decryption is performed using a secret key.

For example, a homomorphic ciphertext generated in the terminal devices 100-1 to 100-$n$ may be generated such that the following property is satisfied when decryption is performed using a secret key.

$$Dec(ct,sk)=<ct,sk>=\Delta M+e(\bmod q) \quad \text{[Mathematical formula 1]}$$

Here, the < and > denote a usual inner product, the ct denotes a ciphertext, the sk denotes a secret key, the M denotes a plaintext message, the e denotes an encryption error value, the $\Delta$ denotes a scaling factor, and the q denotes a modulus of a ciphertext. It is necessary that the q is larger than the $\Delta M$ which is a result value obtained by multiplying a message by a scaling factor. If an error value e is sufficiently small as compared to the $\Delta M$, the $\Delta M+e$, which is a decryption value of the ciphertext, may be a value that can replace the original message with the same precision in significant numeric computations. From among the decrypted data, the error may be disposed on a lowest bit (LSB) side, and the $\Delta M$ may be disposed on a second lowest bit side.

If a size of the message is too small or too large, the size may be adjusted using a scaling factor. When a scaling factor is used, a message in a real number form as well as a message in an integer form may be encrypted, and thus usability can be significantly increased. In addition, by adjusting a size of the message using the scaling factor, a size of a domain where messages are present in the ciphertext after the computation is performed, that is, a size of a valid domain, may be adjusted.

In an embodiment, a ciphertext modulus q may be set in various forms and used. For example, a modulus of a ciphertext may be set as $q=\Delta^L$ which is an exponentiation of a scaling factor. If the $\Delta$ is 2, it may be set as a value such as $q=2^{10}$.

As another example, a ciphertext modulus may be set as a plurality of integer values which are disjoint from each other. For example, it may be set such that $q=q_1q_2q_3, \ldots, q_x$, where each of the $q_1q_2q_3, \ldots, q_x$ is of a similar size to the scaling factor $\Delta$, and is set as values that are in a disjoint relationship with each other. When a scaling factor is set in this manner, the entire computation may be divided into a plurality of modulus computations according to a Chinese Remainder Theorem (CRT), and thus computation burden can be reduced. A method of using a plurality of disjoint integer values will be referred to an RNS HEAAN method, which will be descried in greater detail with reference to FIGS. 12 to 16.

As described above, the ciphertext generated in the respective terminal devices 100-1 to 100-$n$ may be processed by the first server device 200, and then transmitted in the form of a ciphertext to the second server device 300. The second server device 300 may decrypt the obtained ciphertext using a secret key. Since a homomorphic encryption processing has been performed, the decrypted data may be a value such as a result obtained from decrypting the message itself and performing a computation processing of the decrypted message. As a result, it is possible to prevent the risk of leakage to third parties in the intermediate process.

In the embodiment of FIG. 9, a public key used to perform encryption may be generated by the respective terminal devices, or may be generated in the second server device 300 performing decryption, and then distributed to the respective terminal devices. Hereinafter, for convenience of explanation, it will be described that various keys are generated on the terminal device 100 side.

A Ring-LWE method may be used in the key generation process.

The terminal device 100 may receive input of various parameters for generating a key and setting a ring. For example, various parameters such as a length of plaintext message bits, a size of the public key and secret key, etc. may be set. In addition, the terminal device 100 may generate a setting parameter necessary for generating a secret key and a public key on the basis of the received parameter.

The ring may be expressed as in the mathematical formula as shown below.

$$R=\mathbb{Z}_q[x]/f(x) \quad \text{[Mathematical formula 2]}$$

Here, the R denotes a ring, the Zq denotes a coefficient, and the f(x) denotes an n-th polynomial.

The ring is a set of polynomials of a preset coefficient in which addition and multiplication between the elements are defined, and is a closed set for addition and multiplication. The ring may be referred to as an annulus.

In the mathematical formula 2 shown above, if n is $\Phi(N)$, f(x) denotes an n-th cyclotomic polynomial. (F(x)) denotes an ideal of Zq[x] generated by f(x). An Euler totient function, $\Phi(N)$, denotes the number of natural numbers that are disjoint from N and less than N. When $\Phi_N(x)$ is defined as an n-th cyclotomic polynomial, a ring may be expressed as in the mathematical formula as shown below. In addition, when a reciprocal equation is used in the polynomial shown above, the ring may be expressed as in the mathematical formula 15.

$$R=\mathbb{Z}_q[x]/(\Phi_N(x)) \quad \text{[Mathematical formula 3]}$$

$$R=\mathbb{Z}[X]/(X^n+1) \quad \text{[Mathematical formula 15]}$$

The ring of the mathematical formulas 3 and 15 shown above has a complex number in a plaintext space. In the disclosure, to improve a computation speed with respect to a homomorphic ciphertext, only a set of which a plaintext space is a real number from among the set of rings described above may be used. Here, a ring of which a plaintext space is a real number will be referred to as an R', which may be expressed as in the mathematical formula as shown below. A method of using the R' will be referred to as a Real HEAAN method.

$$R'=\{a(X)\in \mathbb{Z}[X]/(X^n+1):a(X)=a(X^{-1})\}\subset R$$
$$\text{where } X^{-1}:=-X^{n-1} \quad \text{[Mathematical formula 16]}$$

When such a ring is set, the terminal device 100 may calculate a secret key (sk) from the ring.

$$sk\leftarrow(1,s) \quad \text{[Mathematical formula 17]}$$

Here, the S denotes a value which is randomly generated as a small coefficient.

In addition, the terminal device 100 may calculate a first random polynomial (a) from the ring. The first random polynomial may be expressed as shown below.

$$a\leftarrow U(R'_{q_L}) \quad \text{[Mathematical formula 18]}$$

In addition, the terminal device 100 may calculate an error. For example, the terminal device 100 may extract an error from a discrete Gaussian distribution or a distribution that is within a short statistical distance thereto. This error may be expressed as shown below.

$$e \leftarrow X_{err} \quad \text{[Mathematical formula 19]}$$

When an error is calculated, the terminal device 100 may modulate the error with the first random polynomial and the secret key, and calculate a second random polynomial. The second random polynomial may be expressed as shown below.

$$b \leftarrow -as + e (\mathrm{mod}_{q_L}) \quad \text{[Mathematical formula 20]}$$

Finally, the public key (pk) may be set as shown below, so that the first random polynomial and the second random polynomial are included.

$$pk \leftarrow (b, a) \in R'^2_{q_L} \quad \text{[Mathematical formula 21]}$$

The terminal device 100 may transmit the generated public key to other terminal devices 100-2 to 100-n and/or the server device 200.

In the example described above, it is described that the terminal device 100 generates a public key and a secret key. However, in another example, the server device 200 or another device may generate at least one of a public key or a secret key, and then share it with another device. In addition, the key generation method described above is only an example, and is not limited thereto. A public key and a secret key may be generated in different ways.

The operation of generating a public key and a secret key will be described in greater detail below with reference to FIG. 12.

Figure 10:
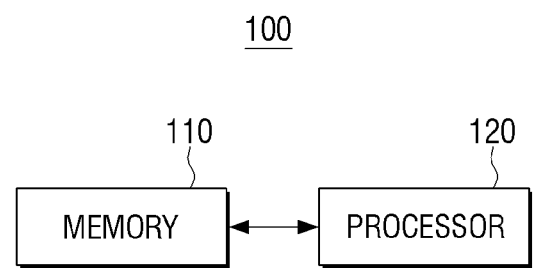
FIG. 10 is a block diagram illustrating a brief configuration of a terminal device, according to an embodiment of the disclosure.

FIG. 10 is a block diagram illustrating a brief configuration of a terminal device, according to an embodiment of the disclosure.

Referring to FIG. 10, the terminal device 100 may include a memory 110 and a processor 120.

The memory 110 is configured to store an operating system (O/S), various software and data necessary for operating the terminal device 100. The memory 110 may be a variety of forms such as RAM, ROM, flash memory, HDD, external memory, memory card and the like, and is not limited to any one.

The memory 110 may store a message to be encrypted. Here, the message may be various credit information, personal information and the like utilized by the user, and may be information relating to a use history such as location information, Internet use time information and the like used in the terminal device 100.

In addition, the memory 110 may store a public key, and in a case that the terminal device 100 is a device that has directly generated the public key, store various parameters necessary for generating a public key and a secret key.

In addition, the memory 110 may store a homomorphic ciphertext generated in the following process.

The processor 120 may be configured to control each component in the terminal device 100. The processor 130 may be implemented as one device, such as a CPU, and may be also implemented as a plurality of devices, such as a clock generating circuit, a CPU, a graphic processor, and the like.

In addition, the processor 120 may execute a program stored in the memory 110, and generate a secret key and a public key necessary for generating a homomorphic ciphertext. To this end, primarily, the processor 120 may set a ring which is a set of polynomials of a preset coefficient. In this case, the ring may satisfy the mathematical formula 15 or 16 shown above.

In addition, the processor 120 may calculate a secret key from the ring. For example, the processor 120 may calculate a secret key (SK) from the ring on the basis of the mathematical formula as shown below.

In addition, the processor 120 may calculate a first random polynomial (a) from the ring, and extract an error from a discrete Gaussian distribution or a distribution that is within a short distance thereto.

In addition, the processor 120 may modulate an error to the first random polynomial and the secret key and calculate a second random polynomial, and finally generate a public key (pk) including the first random polynomial and the second random polynomial. In a case that the terminal device 100 supports RNS HEAAN, the processor 120 may generate a plurality of public keys respectively corresponding to a plurality of disjoint integers.

In addition, the processor 120 may generate a homomorphic ciphertext with respect to a message. For example, the processor 120 may apply the previously-generated public key to the message, and generate a homomorphic ciphertext.

In a case that the terminal device 100 supports RNS HEAAN, the processor 120 may generate a homomorphic ciphertext expressed as a plurality of bases by using the plurality of public keys respectively corresponding to the plurality of disjoint integers in the message.

In addition, the processor 120 may calculate a message to be encrypted as a polynomial corresponding to the ring, and apply the public key to the obtained polynomial and generate a homomorphic ciphertext. A message to be encrypted may be received from an external source, or may be input from an input device directly provided in the terminal device 100 or from an input device connected to the terminal device 100. In addition, a scaling factor may be directly input by a user, or may be provided through another device.

The modulus q of the ciphertext mentioned above may be set differently according to embodiments. For example, the processor 120 may set the ciphertext modulus in the form of $q = \Delta^L$ which is an exponentiation of a scaling factor $\Delta$. As another example, the processor 120 may utilize a value which is set as a plurality of disjoint integer values.

In addition, the processor 120 may generate a length of ciphertext to correspond to a size of the scaling factor.

Meanwhile, according to an embodiment, packing may be performed. When a packing is used in the homomorphic encryption, it is possible to encrypt multiple messages to a single ciphertext. In this case, when computation between the respective ciphertext is performed in the first server device 200, as a result, computation of the multiple messages may be processed in parallel, and thus computation burden is significantly reduced.

In a case that the message is implemented as a plurality of message vectors, the processor 120 may convert the plurality of message vectors into a polynomial in a form that is capable of being encrypted in parallel, and then multiply a scaling factor by the polynomial and perform homomorphic encryption using the public key. Accordingly, a ciphertext generated by packing the plurality of message vectors may be generated.

The processor 120 may perform computation with respect to a homomorphic ciphertext. For example, the processor 120 may perform computation such as addition or multiplication, in a state that encryption of the homomorphic ciphertext is performed. For example, the processor 120 may perform a first function process with respect to the respective homomorphic ciphertext which will be used in the computation, perform computation such as addition or multiplication between the homomorphic ciphertext for which the first function process has been performed, and perform a second function process which is an inverse function of the first function with respect to the homomorphic ciphertext for which the computation has been performed. Here, the first function may be a Number Theoretic Transform (NTT) function.

In a case that the homomorphic ciphertext is generated using the RNS method described above, the processor 120 may perform addition and multiplication for each basis in the generated homomorphic ciphertext.

Meanwhile, when the computation is complete, the terminal device 100 may detect data of a valid domain from the computation result data. For example, the terminal device 100 may perform a rounding process of the computation result data, and detect data of a valid domain. The rounding process means rounding-off a message in an encrypted state, and may be differently referred to as rescaling. For example, the terminal device 100 may multiply each component of the ciphertext by a reciprocal of a scaling factor, $\Delta^{-1}$, and round off the result, and eliminate a noise domain. The noise domain may be determined to correspond to a size of the scaling factor. As a result, a message of a valid domain from the noise domain is excluded may be detected. Since the rounding process is performed in an encrypted state, a further error occurs. However, the error is small enough to be ignored.

In a case that the terminal device 100 supports RNS HEAAN, if a weight of any one of a plurality of bases exceeds a threshold, the processor 120 may perform a rounding process of a message with respect to each of the plurality of bases within the generated homomorphic ciphertext, and rescale the homomorphic ciphertext.

In addition, if a weight of an approximate message within the computation result ciphertext exceeds a threshold, the terminal device 100 may expand a plaintext space of the computation result ciphertext. For example, if q is less than M in the mathematical formula 1 shown above, M+e(mod q) has a different value from M+e, and thus it is impossible to perform decryption. Accordingly, it is necessary to always maintain a value of q to be larger than M. However, as computation is proceeded, a value of q may be gradually decreased. The expansion of the plaintext space means changing a ciphertext (ct) to a ciphertext with a larger modulus. An operation of expanding a plaintext space may be alternatively referred to as rebooting. As rebooting is performed, the ciphertext may be in a state that computation is possible again.

Meanwhile, although the above illustrates and describes only the brief configuration of the terminal device 100, various elements may be additionally included in actual implementation. This will be described below with reference to FIG. 11.

Figure 11:
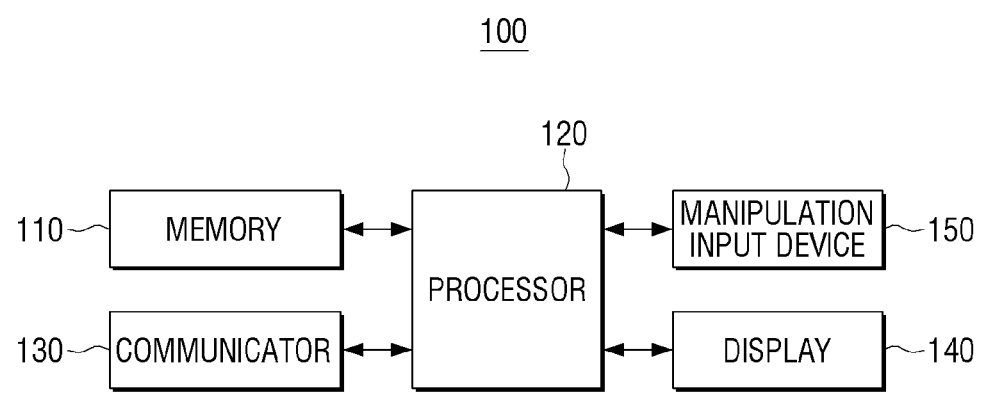
FIG. 11 is a block diagram illustrating a detailed configuration of a terminal device, according to an embodiment of the disclosure.

FIG. 11 is a block diagram illustrating a detailed configuration of a terminal device, according to an embodiment of the disclosure.

Referring to FIG. 11, the terminal device 100 may include a memory 110, a processor 120, a communicator 130, a display 140, and a manipulation input device 150.

Since the memory 110 has been described with reference to FIG. 10, an overlapped description will be omitted. In addition, the processor 120 is explained in FIG. 10, and thus will not be further explained below for the sake of brevity. Only added elements in FIG. 11 will be explained below.

The communicator 130 is formed to connect the terminal device 100 to an external device (not illustrated), and may be connected via not only a local area network (LAN) or the Internet but also a universal serial bus (USB) port or a wireless communication (e.g., Wi-Fi 802.11a/b/g/n, near field communication (NFC), or Bluetooth) port. The communicator 130 may be referred to as a 'transceiver'.

The communicator 130 may receive a public key from an external device, and transmit a public key generated in the terminal device 100 to the external device.

In addition, the communicator 130 may receive a message from an external device, and transmit a generated homomorphic ciphertext to the external device.

In addition, the communicator 130 may receive various parameters necessary for generating a ciphertext from an external device. In an implementation, the various parameters may be directly received from a user via the manipulation input device 150 which will be described later.

The display 140 may display a user interface window to select a function supported by the terminal device 100. For example, the display 140 may display a user interface window to select various functions provided by the terminal device 100. The display 140 may be a monitor such as an LCD, CRT, OLED, and the like, and may also be implemented as a touch screen which is capable of simultaneously carrying out the functions of the manipulation input device 150 which will be described later.

The display 140 may display a message requesting input of parameters necessary for generating a secret key and a public key. In addition, the display 140 may display a message allowing a subject of encryption to select the message. In an implementation, the subject of encryption may be directly selected by the user or automatically selected. That is, personal information for which encryption is necessary may be automatically selected, even if the user does not directly select the message.

The manipulation input device 150 may receive, from the user, input of a selection of function of the terminal device 100 or a control command with respect to the corresponding function. For example, the manipulation input device 150 may receive, from the user, input of parameters necessary for generating a secret key and a public key. In addition, the manipulation input device 150 may receive, from the user, setting of a message to be encrypted.

When parameters necessary for generating a secret key and a public key are received from the user, the processor 120 may generate a setting parameter based on the received parameters, and generate a secret key and a public key based on the generated setting parameter.

In addition, when it is necessary to generate a ciphertext with respect to the message, the processor 120 may apply the public key to the message, and generate a homomorphic ciphertext. For example, the processor 120 may convert the message to a polynomial, and apply the public key to the converted message of the polynomial form, and generate a homomorphic ciphertext.

In addition, the processor 120 may, if decryption of the homomorphic ciphertext is necessary, apply the secret key to the homomorphic ciphertext and generate a deciphertext in a polynomial form, and decode the deciphertext in the polynomial form and generate a message. The generated message may include an error as described in the mathematical formula 1 shown above.

In addition, if it is necessary to perform computation with respect to the homomorphic ciphertext, the processor 120 may perform an addition or multiplication computation with respect to a plurality of homomorphic ciphertext requested by the user. A specific computation operation is explained below in more detail with reference to FIGS. 15 and 16.

As described above, the terminal device 100 according to an embodiment may generate a homomorphic ciphertext to the message, and thus it is possible to improve stability of the message even when computation is necessary. In addition, the generated homomorphic ciphertext includes an error, and it is possible to maintain stable security for biometric information requiring high security. In addition, the terminal device 100 according to an embodiment uses a ring of which a plaintext space is a real number, and thus computation speed can be improved. That is, a parallel real number computation can be performed twice as much as in a case where a related-art ring of which a plaintext space is a complex number is used.

Hereinafter, an algorithm of a Real HEAAN method will be first described.

A computation between ciphertext is an addition and multiplication computation between $R'_q$ elements, and thus it is necessary to increase computation efficiency on the $R'_q$. Performing multiplication in the most naive manner on the $R'_q$ has a complexity of o(n2). To reduce this computation complexity, a Number Theoretic Transform (NTT) method is used in this disclosure. The $NTT_m$ denotes a field isomorphism from $Z_q[X]/(X^m-1)$ to $\mathbb{Z}_q^m$, and its inverse function is referred to as $INTT_m$.

The $NTT_m$ and $INTT_m$ may have a complexity of o(m log m) when Fast Fourier Transform algorithm is applied.

That is, in a case that a(X)·b(X) is to be calculated with respect to a(X), b(X)∈$Z_q[X]/(X^m-1)$, when computation is performed as in $INTT_m(NTT_m(a(X))\odot NTT_m(b(X))$, the complexity may be o(m log m).

A method for applying the above-described method to a ring will be described below.

When the respective elements belonging to the ring may satisfy a(X)∈$R'_q$, and $$a_0, a_1, \ldots, a_{\frac{n}{2}-1} \in \mathbb{Z}_q.$$

an element may be expressed as in the mathematical formula 22 as shown below.

$$a(X) = a_0 + \sum_{i=1}^{\frac{n}{2}-1} a_i(X^i - X^{n-i}) \quad \text{[Mathematical formula 22]}$$

First, regarding $NTT_m(NTT'_{n/2})$ with respect to R', $\phi$(a(X)) may be calculated and function $\phi$ may be expressed as in the mathematical formula 23 as shown below.

$$\Phi: R'_q \to \mathbb{Z}_q^{n/2} \quad \text{[Mathematical formula 23]}$$

$$a(X) \to \left(a_0, a_1 \cdot w_m + a_{\frac{n}{2}-1} \cdot w_m^{1-\frac{n}{2}}, \ldots, a_{\frac{n}{2}-1} \cdot w_m^{\frac{n}{2}-1} + a_1 \cdot w_m^{-1}\right)$$

In addition, regarding $INTT_m(INTT'_{n/2})$ with respect to R', $\phi^{-1}(INTT_{n/2}(a))$ may be calculated and a value as shown in the mathematical formula 24 may be output.

$$\Phi^{-1}: \mathbb{Z}_q^{n/2} \to R'_q \quad \text{[Mathematical formula 24]}$$

$$\left(a_0, \ldots, a_{\frac{n}{2}-1}\right) \to \tilde{a}_0 + \sum_{i=1}^{\frac{n}{2}-1} \tilde{a}_i(X^i - X^{n-i}),$$

Here, $$\left(\tilde{a}_0, \tilde{a}_1, \ldots, \tilde{a}_{\frac{n}{2}-1}\right) = \left(a_0, 2^{-1} \cdot \left(a_1 \cdot w_m^{-1} + a_{\frac{n}{2}-1} \cdot w_m\right), \ldots, 2^{-1} \cdot \left(a_{\frac{n}{2}-1} \cdot w_m^{1-\frac{n}{2}} + a_1 \cdot w_m^{\frac{n}{2}-1}\right)\right).$$

Accordingly, the mathematical formulas 23 and 24 shown above may be expressed as shown below.

$$INTT'_{n/2}(NTT'_{n/2}(a(X)) + NTT'_{n/2}(b(x))) = a(X) + b(X)$$

$$INTT'_{n/2}(NTT'_{n/2}(a(X)) \odot NTT'_{n/2}(b(x))) = a(X) \cdot b(X) \quad \text{[Mathematical formula 25]}$$

That is, both NTT and Inverse NTT with respect to $R'_q$ may have a complexity of o(n log n). Accordingly, in a case that a(X), b(X)∈$R'_q$ is satisfied, when a(X)·b(X) is to be calculated, if computation is performed as in $INTT'_{n/2}(NTT'_{n/2}(a(X)) \odot NTT'_{n/2}(b(X)))$, a complexity of o(n log n) may be obtained.

Hereinafter, an algorithm for generating a secret key and a public key, a method for generating homomorphic ciphertext and a computation method in a case where REAL HEAAN is applied will be described in greater detail with reference to FIGS. 12 to 16.

Figure 12:
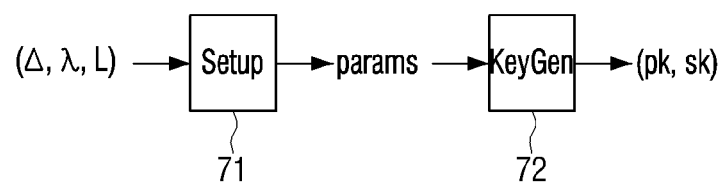
FIG. 12 is a diagram illustrating a process of generating of a public key and a secret key.

FIG. 12 is a diagram illustrating a process of generating of a public key and a secret key. Referring to FIG. 12, a setup module 71 may receive input of a scaling factor (Δ), a security parameter (λ) and a level parameter (L) from a user. Here, the scaling factor (Δ) is a parameter for adjusting a size of a message, and is greater than 1. In addition, the security parameter (λ) is an index indicating the stability of a skim, and may be referred to as a computation complexity. In addition, the level parameter is an index indicating a depth supporting computation.

The setup module 71 receiving input of the parameters as described above may set moduli, randomly select an integer (n) and a positive number (P), and output a setting parameter such as (n, $(q_i)_{1 \leq i \leq L}$, P, Δ).

A key generation module 72 may receive input of a setting parameter previously generated in the setup module 71, and generate a secret key and a public key based on the received setup parameter.

For example, the key generation module 72 may generate a secret key based on s←$X_{key}$ and sk←(1, s), and calculate an error based on e←$X_{err}$.

In addition, the key generation module 72 may generate a first random polynomial as in a←U($R'_{q_L}$), and generate a second random polynomial as in b←−as+e (mod$_{q_L}$). In addition, based on the first and second random polynomials generated above, a public key as in the mathematical formula 21 may be generated.

Figure 13:
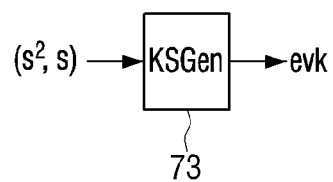
FIG. 13 is a diagram illustrating an operation of generating a computation key.

FIG. 13 is a diagram illustrating an operation of generating a computation key.

Referring to FIG. 13, the computation module 73 may calculate a value satisfying $s_1$, $s_2$∈R', a'←U($R'_{P \cdot q_L}$) and e'←−Xerr, and calculate $$swk \leftarrow (b', a') \in R'^2_{P \cdot q_L}$$

satisfying b'←−a'$s_2$+e'+P·$s_1$(mod P·$q_L$). Accordingly, the computation module 73 may output a computation key such as evk←KSGen($s^2$, s).

Figure 14:
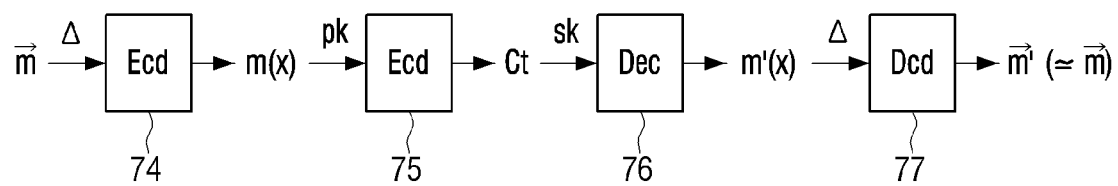
FIG. 14 is a diagram illustrating an operation of generating and decrypting an approximate encryption ciphertext.

FIG. 14 is a diagram illustrating an operation of generating and decrypting an approximate encryption ciphertext.

Referring to FIG. 14, an encoding module 74 may receive input of a message and a scaling factor, and reflect the scaling factor to the message and convert it to a polynomial form.

For example, when $\vec{m}=(m_i)_{0\leq j<n/2}\in\mathbb{R}^{n/2}$ and a scaling factor greater than 1 are input, the encoding module 74 may output the message as a polynomial as shown in the mathematical formula 26.

$$m(X)=\tau^{-1}(\lfloor\Delta\cdot\vec{m}\rfloor_{\tau(R')})\in R' \qquad \text{[Mathematical formula 26]}$$

Here, the m(x) denotes a message in a polynomial form.

In addition, an encryption module 75 may receive the message in the polynomial form, and reflect a public key to the received message and generate homomorphic ciphertext. For example, a homomorphic ciphertext may be generated using the mathematical formula 27 as shown below.

$$v\cdot pk+(m+e_0,e_1)(\bmod q_L) \qquad \text{[Mathematical formula 27]}$$

Here, the v denotes an element selected according to Xenc, and the $e_0$ and the $e_1$ denote an error value selected according to Xerr.

A decryption module 76 may receive input of a ciphertext and a secret key, and decrypt the ciphertext and output a message including errors. For example, in a case that the input ciphertext is as in $$ct=(c_0, c_1)\in R'^2_{q_l},$$

the decryption module 76 may output a message such as m′=$c_0+c_1\cdot s$ (mod $q_l$).

A message output from the decryption module 76 is a message in a polynomial form, and thus the decoding module 77 may output a final message based on the message output from the decryption module 76 and the scaling factor. For example, in a case that the polynomial message satisfies m(X)∈R′, the decryption module 76 may output a message such as $\vec{m}=(m_j=\Delta^{-1}\cdot m(\zeta_j))_{0\leq j<n/2}\in\mathbb{R}^{n/2}$.

Figure 15:
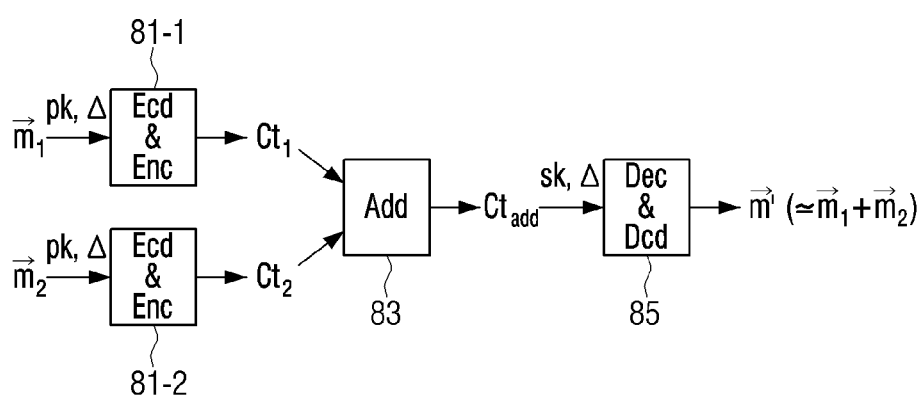
FIG. 15 is a diagram illustrating an addition calculation of a homomorphic ciphertext.

FIG. 15 is a diagram illustrating an addition calculation of a homomorphic ciphertext.

Referring to FIG. 15, a first terminal device 81-1 may output a first homomorphic ciphertext $Ct_1$ of a first message, and a second terminal device 81-2 may output a second homomorphic ciphertext $Ct_2$ of a second message.

The computation module 83 of the server device receiving the first homomorphic ciphertext $Ct_1$ and the second homomorphic ciphertext $Ct_2$ may perform an addition computation for the two homomorphic ciphertext. For example, in a case that ct=($c_0$, $c_1$)∈$R'_{q_l}{}^2$ is satisfied, the computation module 83 may perform an addition computation for the two homomorphic ciphertext as in $ct_{add}$←ct+ct′ (mod $q_l$).

That is, it is possible to perform a first function process of the two homomorphic ciphertext, to perform an addition computation for the homomorphic ciphertext for which the function process has been performed, to perform a second function process, which is an inverse function of the first function, of the homomorphic ciphertext for which the addition computation has been performed, and perform an addition computation for the two ciphertext.

Thereafter, in a case that an actual value is necessary, a decryption module 85 may decrypt and decode the addition result, and output the sum of the first and second messages.

Figure 16:
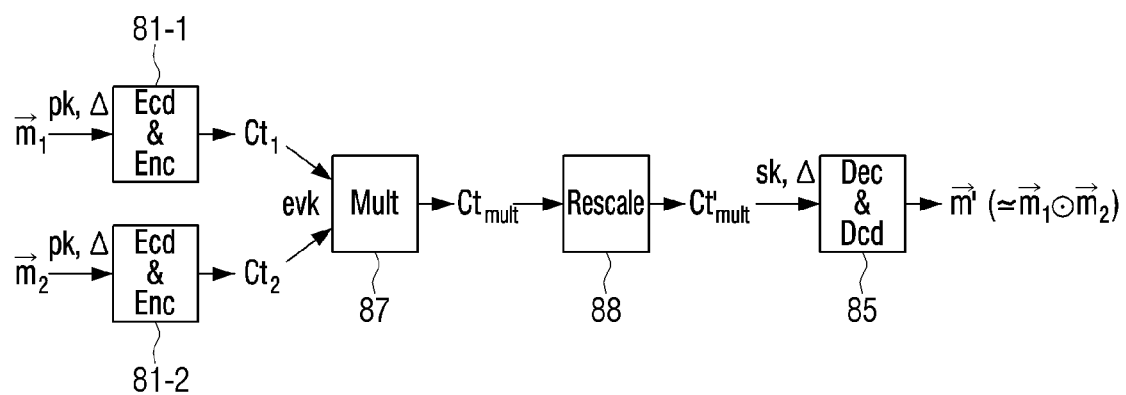
FIG. 16 is a diagram illustrating a multiplication calculation of a homomorphic ciphertext.

FIG. 16 is a diagram illustrating a multiplication calculation of a homomorphic ciphertext.

Referring to FIG. 16, a first terminal device 81-1 may output a first homomorphic ciphertext $Ct_1$ of a first message, and a second terminal device 81-2 may output a second homomorphic ciphertext $Ct_2$ of a second message. The computation module 87 of the server device receiving the first homomorphic ciphertext $Ct_1$ and the second homomorphic ciphertext $Ct_2$ may perform a multiplication computation for the two homomorphic ciphertext. For example, in a case that ct=($c_0$, $c_1$), ct′=($c'_0$, $c'_1$)∈$R'_{q_l}{}^2$ is satisfied, the computation module 87 may perform an addition computation for the two homomorphic ciphertext as in $ct_{mult}$←($d_0$, $d_1$)+$\lfloor P^{-1}\cdot d_2\cdot\text{evk}\rfloor$(mod $q_l$). Here, let ($d_0$, $d_1$, $d_2$)=($c_0 c'_0$, $c_0 c'_1$+$c_1 c'_0$, $c_1 c'_1$) (mod $q_l$).

That is, it is possible to perform a first function process of the two homomorphic ciphertext, to perform a multiplication computation for the homomorphic ciphertext for which the function process has been performed, to perform a second function process, which is an inverse function of the first function, of the homomorphic ciphertext for which the multiplication computation has been performed, and perform a multiplication computation for the two ciphertext.

In addition, if a weight of an approximate message within the computation result ciphertext obtained by computation exceeds a threshold, a rescaling module 88 may expand a plaintext space of the computation result ciphertext. For example, the rescaling module 88 may update ciphertext as in the mathematical formula 28 as shown below.

$$ct' \leftarrow \lfloor (q_{l'}/q_l)\cdot ct \rfloor (\bmod q_{l'}) \qquad \text{[Mathematical formula 28]}$$

Here, l′=l−1.

Thereafter, the decryption module 85 may decrypt and decode the addition result, and output the sum of the first and second messages.

The Real HEAAN method is described above, and the RNS HEAAN method will be described below.

To resolve the problem that a method such as the Chinese remainder theorem is not applicable in previous HEAAN method, the RNS HEAAN which substitutes $R_{q_i}$ ($q_i=\Delta^i$) which is a previous ciphertext space for $R_{q_i}$($q_i=\Pi p_i$, $p_i\approx\Delta$) is used. Accordingly, a size of error bits may have an approximate computation result which is five to ten times larger, but there is a performance improvement of three to ten times in terms of the computation speed.

An operation method is similar to the REAL HEAAN method described above, and thus only differences will be described below.

First, in the RNS HEAAN, a modulus may be defined as a plurality of disjoint integers as shown in the mathematical formula 29 shown below.

$$[P^{-1}]_{q_j}=(\Pi_{i=0}^{k-1} p_i)^{-1}(\bmod q_j) \text{ for } 0\leq j\leq L \qquad \text{[Mathematical formula 29]}$$

Accordingly, the generated evaluation key may be as in the mathematical formula 30 as shown below, and the public key may be expressed as a plurality of bases respectively corresponding to the plurality of disjoint numbers as shown in the mathematical formula 31.

$$(swk^{(0)} = (b'^{(0)}, a'^{(0)}, \ldots,$$
$$swk^{(k+L)} = (b'^{(k+L)}, a'^{(k+1L)})) \in$$
$$\prod_{i=0}^{k-1} R^2_{p_i} \times \prod_{j=0}^{L} R^2_{q_j} \qquad \text{[Mathematical formula 30]}$$

Here, $b'^{(i)} \leftarrow -a'^{(i)} \cdot s_2 + e' \pmod{p_i}$ for $0 \le i < k$, and $b'^{(k+j)} \leftarrow -a'^{(k+j)} \cdot s_2 + [P]_{q_j} \cdot s_1 + e' \pmod{q_j}$ for $0 \le j \le L$. In addition, $(a^{(0)}, \ldots, a^{(L)}) \leftarrow U(\Pi_{j=0}^L R_{q_j})$.

$$pk \leftarrow (pk^{(j)} = (b^{(j)}, a^{(j)}) \in R_{q_j}^2)_{0 \le k \le L} \quad \text{[Mathematical formula 31]}$$

Here, $b^{(j)} \leftarrow -a^{(j)} \cdot s + e \pmod{q_j}$ for $0 \le j \le L$, and $(a^{(0)}, \ldots, a^{(L)}) \leftarrow U(\Pi_{j=0}^L R_{q_j})$. Accordingly, in a case that a ciphertext is generated, a homomorphic ciphertext expressed as a plurality of bases as in the mathematical formula 32 as shown below may be generated.

$$ct = (ct^{(j)})_{0 \le j \le L} \in \Pi_{j=0}^L R_{q_j}^2 \quad \text{[Mathematical formula 32]}$$

Here, $ct^{(j)} \leftarrow v \cdot pk^{(j)} + (m + e_0, e_1) \pmod{q_j}$ for $0 \le j \le L$, $v \leftarrow X_{enc}$, and $e_0, e_1 \leftarrow X_{err}$.

Meanwhile, an addition computation for the homomorphic ciphertext $(ct = (ct^{(0)}, \ldots, ct^{(l)})$ and $ct' = (ct'^{(0)}, \ldots, ct'^{(l)}))$ generated in the RNS HEAAN method may be performed as in the mathematical formula 33 as shown below.

$$ct_{add} = (ct_{add}^{(j)})_{0 \le j \le l}$$

Here, $ct_{add}^{(j)} \leftarrow ct^{(j)} + ct'^{(j)} \pmod{q_j}$ for $0 \le j \le l$.

Meanwhile, a computation for the homomorphic ciphertext $(ct = (ct^{(j)} = (c_0^{(j)}, c_1^{(j)}))_{0 \le j \le l}$ and $ct' = (ct'^{(j)} = (c'_0^{(j)}, c'_1^{(j)}))_{0 \le j \le l})$ generated in the RNS HEAAN method may be performed as in the following steps.

First, a computation as in the mathematical formula 34 may be performed primarily.

$$d_0^{(j)} \leftarrow c_0^{(j)} c'_0^{(j)} \pmod{q_j},$$
$$d_1^{(j)} \leftarrow c_0^{(j)} c'_1^{(j)} + c_1^{(j)} c'_0^{(j)} \pmod{q_j},$$
$$d_2^{(j)} \leftarrow c_1^{(j)} c'_1^{(j)} \pmod{q_j}. \quad \text{[Mathematical formula 34]}$$

Then, a modup operation may be performed as in the mathematical formula 35.

$$\text{Mod } U_{P_{cl} \to D_l}(d_2^{(0)}, \ldots, d_2^{(l)}) = (\tilde{d}_2^{(0)}, \ldots, \tilde{d}_2^{(k-1)}, d_2^{(0)}, \ldots, d_2^{(l)}) \quad \text{[Mathematical formula 35]}$$

Then, a secondary computation as in the mathematical formula 36 may be performed.

$$\widetilde{\vec{ct}} = (\widetilde{\vec{ct}}^{(0)} = \quad \text{[Mathematical formula 36]}$$
$$(\tilde{c}_0^{(0)}, \tilde{c}_1^{(0)}), \ldots, \widetilde{\vec{ct}}^{(k+l)} = (\tilde{c}_0^{(k+l)}, \tilde{c}_1^{(k+l)})) \in$$
$$\prod_{i=0}^{k-1} R_{p_i}^2 \times \prod_{j=0}^{L} R_{q_j}^2$$

Here, $\widetilde{\vec{ct}}^{(i)} = (\tilde{d}_2^{(i)} \cdot evk^{(i)} \pmod{p_i}$, and $\widetilde{\vec{ct}}^{(k+j)} = \tilde{d}_2^{(j)} \cdot evk^{(k+j)} \pmod{q_j}$.

In addition, a computation as in the mathematical formula 37 may be performed, and finally, a value as in the mathematical formula 38 may be output.

$$(\hat{c}_0^{(0)}, \ldots, \hat{c}_0^{(l)}) \leftarrow \text{ModDown}_{D_l \to c_l}(\tilde{c}_0^{(0)}, \ldots, \tilde{c}_0^{(k+l)}),$$
$$(\hat{c}_1^{(0)}, \ldots, \hat{c}_1^{(l)}) \leftarrow \text{ModDown}_{D_l \to c_l}(\tilde{c}_1^{(0)}, \ldots, \tilde{c}_1^{(k+l)}) \quad \text{[Mathematical formula 37]}$$

$$ct_{mult} = (ct_{mult}^{(j)})_{0 \le j \le l} \quad \text{[Mathematical formula 38]}$$

Here, $ct_{mult}^{(j)} \leftarrow (\hat{c}_0^{(j)} + d_0^{(j)}, \hat{c}_1^{(j)} + d_1^{(j)}) \pmod{q_j}$.

After computation, if a weight of at least one bases of the ciphertext $(ct = (ct^{(j)} = (c_0^{(j)}, c_1^{(j)}))_{0 \le j \le l} \in \Pi_{j=0}^l R_{q_j}^2)$ exceeds a threshold, a rounding process of a message for each of the plurality of bases may be performed as in the mathematical formula 39 as shown below, and rescale the homomorphic ciphertext, and the rescaled ciphertext $ct' \leftarrow (ct'^{(j)} = (c'_0^{(j)}, c'_1^{(j)}))_{0 \le j \le l-1} \in \Pi_{j=0}^{l-1} R_{q_j}^2$ may be output.

$$c'_i{}^{(j)} \leftarrow q_l^{-1} \cdot (c_i^{(j)} - c_i^{(l)}) \pmod{q_j} \text{ for } i = 0, 1 \text{ and } 0 \le j < l \quad \text{[Mathematical formula 39]}$$

Figure 17:
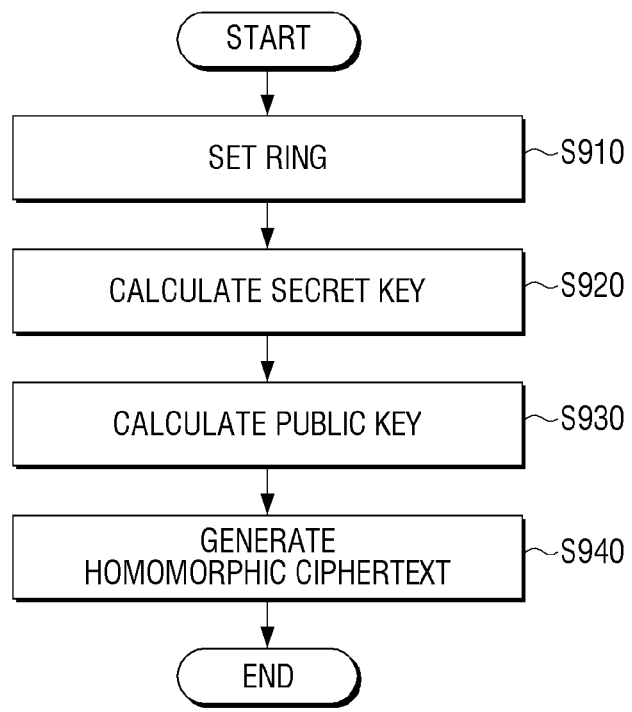
FIG. 17 is a flowchart of an encryption method, according to an embodiment of the disclosure.

FIG. 17 is a flowchart provided to explain an encryption method, according to an embodiment of the disclosure.

First, a ring which is a set of polynomials of a preset coefficient may be set at operation S910. For example, a ring such as the mathematical formula 16 closed to addition and multiplication in which addition and multiplication are defined between the elements and a plaintext space is a real number may be set.

In addition, a secret key may be calculated from the ring, at operation S920. An s may be selected based on Xkey, and a secret key (SK) may be calculated based on the selected s.

In addition, a public key corresponding to the obtained secret key may be calculated at operation S930. For example, a first random polynomial may be calculated from the ring, an error may be extracted, the error may be modulated in the calculated first random polynomial and the secret key and a second random polynomial may be calculated, and a public key may be calculated using the calculated first and second random polynomials.

In addition, the public key may be applied to the message and a homomorphic ciphertext may be generated, at operation S940. For example, encoding of the message may be performed by a polynomial corresponding to the ring, and the public key may be applied to the encoded message and a homomorphic ciphertext may be generated. In a case that the RNS HEAAN is used, a homomorphic ciphertext expressed as a plurality of bases may be generated using a generated plurality of public keys.

As described above, the encryption method according to an embodiment generates a homomorphic ciphertext including errors, and thus it is possible to maintain stable security for biometric information in which high security is required. In addition, since the encryption method according to an embodiment can, using a ring of which a plaintext space is a real number, initially block the increase of the imaginary number part of the plaintext in the computation process, and support twice as many as parallel real number computations with the same stability, computation speed, memory (ciphertext and key size) as the previous HEAAN.

Figure 18:
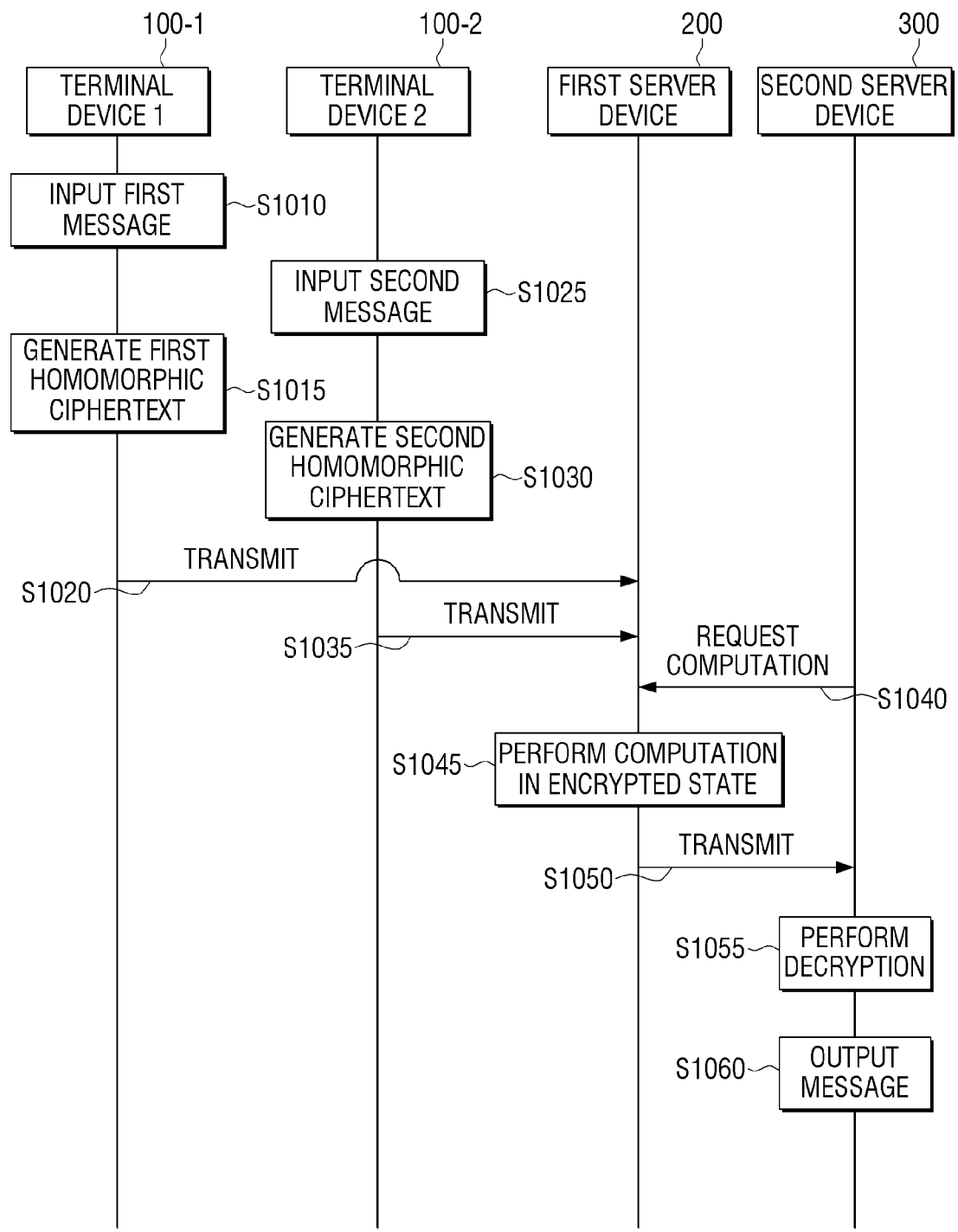
FIG. 18 is a diagram illustrating a ciphertext processing method of a network system, according to an embodiment of the disclosure.

FIG. 18 is a diagram illustrating a ciphertext processing method of a network system, according to an embodiment of the disclosure. In FIG. 18, a case where a ciphertext is transmitted from two terminal devices 100-1 and 100-2 is described.

First, when a first message is received from a terminal device 1 100-1, at operation S1010, the terminal device 1 100-1 may generate a first homomorphic ciphertext as described above, at operation S1015, and transmit the generated first homomorphic ciphertext to the first server device, at operation S1020. For example, in a case that a user of the terminal device 1 100-1 captures an image, the image and a capturing location may be encrypted, and in a case that the user reproduces a music content or accesses a specific URL, the reproduction history and the URL access history may be encrypted.

A terminal device 2 100-2 may generate a ciphertext in a similar manner and transmit the generated ciphertext to the first server device 200, at operations S1025, S1030 and S1035.

The first server device 200 may store the received ciphertext as it is encrypted. In this state, when the second server device 300 requests a specific computation, at operation S1040, the first server device 200 may perform a predetermined computation requested for the homomorphic ciphertext by the second server device 300, at operation S1045, and then transmit the ciphertext for which the predetermined computation has been performed to the second server device, at operation S1050. The second server device 300 may decrypt the received ciphertext, and detect the message.

In addition, the second server device 300 may output a decrypted message, at operation S1060. For example, in a state that the terminal devices 1 and 2 100-1 and 100-2 have respectively transmitted an image to the first server device 200, the second server device 300 may output a photo captured by the respective devices 100-1 and 100-2 at one time.

The encryption method and ciphertext processing method as described above may be used to collect not only an execution result of various applications but also various credit information or personal information directly inputted by a user. In a case that the second server device 300 is a bank server, the bank may collect only necessary items from among credit information of clients and identify only the collected items.

Meanwhile, an encryption method and ciphertext processing method according to the various embodiments described above may be implemented in the form of a program code for performing each step, stored in a recording medium and distributed. In this case, a device on which a recording medium is mounted may perform the encryption or ciphertext processing operations described above.

The recording medium may be a computer-readable medium of various types, such as ROM, RAM, a memory chip, a memory card, an external hard drive, a hard drive, a compact disc (CD), a digital versatile disc (DVD), a magnetic disc, or a magnetic tape.

As described above, when the encryption and ciphertext processing according to the various embodiments of the disclosure are performed, it is safe even in the age of quantum computers, the encryption/decryption speed can be greatly improved, and the size of ciphertext can be reduced. In particular, a message used for encryption may be expanded to a real number domain, and thus usability can be significantly increased.

Although the description of the disclosure is made with reference to the accompanying drawings, the scope of the rights is defined by the appended claims and is not construed as being limited to the described embodiments and/or the drawings. In addition, it should be understood that the disclosure includes various improvements, modifications and changes of the embodiments of the claims which are obvious to those skilled in the art are included in the scope of rights of the disclosure.

What is claimed is:

1. A decryption method, the method comprising:
   receiving a homomorphic ciphertext; and
   obtaining a result value added an error value at a message from the received homomorphic ciphertext,
   wherein the error is disposed on the least significant bit (LSB) side in the result value, and the message is disposed at a position adjacent to the error,
   wherein the homomorphic ciphertext is generated by reflecting a scaling factor in a message, and
   wherein the result value is obtained by multiplying an error value by a value in which the scaling factor is reflected in the message, and
   wherein a modulus of the homomorphic ciphertext is a value obtained by multiplying a plurality of different scaling factors by each other, and the plurality of different scaling factors are set as values which are disjoint from each other.

2. The decryption method as claimed in claim 1,
   wherein a plaintext space of the homomorphic ciphertext is a complex number, and
   wherein the obtaining a result value comprises:
      obtaining a result value from a message of a real number part of the homomorphic ciphertext.

3. The decryption method as claimed in claim 1, further comprising:
   processing a rounding process by multiplying the result value by the inverse of the scaling factor.

4. The decryption method as claimed in claim 1,
   wherein the obtaining a result value comprises:
      generating a deciphertext as a polynomial form by applying a secret key to the received homomorphic ciphertext; and
      decoding the generated deciphertext.

5. The decryption method as claimed in claim 1,
   wherein the homomorphic ciphertext is expressed as a plurality of bases, and
   wherein the obtaining a result value comprises:
      performing a decrypting operation for each basis of the homomorphic ciphertext.

6. A terminal device, comprising:
   a memory configured to store a homomorphic ciphertext; and
   a processor configured to obtain a result value added an error value at a message from the homomorphic ciphertext,
   wherein the error is disposed on the least significant bit (LSB) side in the result value, and the message is disposed at a position adjacent to the error,
   wherein the homomorphic ciphertext is generated by reflecting a scaling factor in a message, and
   wherein the result value is obtained by multiplying an error value by a value in which the scaling factor is reflected in the message, and
   wherein a modulus of the homomorphic ciphertext is a value obtained by multiplying a plurality of different scaling factors by each other, and the plurality of different scaling factors are set as values which are disjoint from each other.

7. The terminal device as claimed in claim 6,
   wherein a plaintext space of the homomorphic ciphertext is a complex number, and
   wherein the processor obtains a result value from a message of a real number part of the homomorphic ciphertext.

8. The terminal device as claimed in claim 6, wherein the processor processes a rounding process by multiplying the result value by the inverse of the scaling factor.

9. The terminal device as claimed in claim 6, wherein the processor generates a deciphertext as a polynomial form by applying a secret key to the received homomorphic ciphertext, and decodes the generated deciphertext.

10. The terminal device as claimed in claim 6,
    wherein the homomorphic ciphertext is expressed as a plurality of bases, and
    wherein the processor performs a decrypting operation for each basis of the homomorphic ciphertext.

11. A non-transitory computer readable recording medium including a program for executing a decryption method,
    wherein the method comprises:
       receiving a homomorphic ciphertext; and
       obtaining a result value added an error value at a message from the received homomorphic ciphertext, and wherein the error is disposed on the least significant bit (LSB) side in the result value, and the message is disposed at a position adjacent to the error, wherein the homomorphic ciphertext is generated by reflecting a scaling factor in a message, and wherein the result value is obtained by multiplying an error value by a value in which the scaling factor is reflected in the message, and wherein a modulus of the homomorphic ciphertext is a value obtained by multiplying a plurality of different scaling factors by each other, and the plurality of different scaling factors are set as values which are disjoint from each other.

\* \* \* \* \*